United States Patent [19]

Baker

[11] Patent Number: 4,485,414
[45] Date of Patent: Nov. 27, 1984

[54] SERVO SYSTEM FOR POSITIONING A MOVABLE TRANSDUCING HEAD ASSEMBLY

[75] Inventor: Billy R. Baker, Redwood City, Calif.

[73] Assignee: Ampex Corporation, Redwood City, Calif.

[21] Appl. No.: 297,291

[22] Filed: Aug. 28, 1981

Related U.S. Application Data

[63] Continuation-in-part of Ser. No. 138,206, Jul. 7, 1980, abandoned, which is a continuation of Ser. No. 956,816, Nov. 1, 1978, abandoned.

[51] Int. Cl.³ .................. H04N 5/782; H04N 5/783
[52] U.S. Cl. .................................. 360/10.3; 360/70; 360/75
[58] Field of Search ............... 360/9, 11, 10.1, 10.2, 360/10.3, 32, 70, 75, 76, 77, 78, 84, 121, 130.22, 130.23, 130.24, 106, 107, 108, 109; 358/312, 334

[56] References Cited

U.S. PATENT DOCUMENTS

| | | | |
|---|---|---|---|
| 4,093,885 | 6/1978 | Brown | 360/77 |
| 4,099,211 | 7/1978 | Hathaway | 360/77 |
| 4,139,871 | 2/1979 | Yoshida et al. | 360/70 |
| 4,143,405 | 3/1979 | Kubota | 360/10.2 |
| 4,148,082 | 4/1978 | Okada et al. | 360/77 |
| 4,163,993 | 8/1979 | Ravizza | 360/77 |
| 4,179,717 | 12/1979 | Maxey | 360/84 |
| 4,364,098 | 12/1982 | Hirota et al. | 360/108 |

FOREIGN PATENT DOCUMENTS 2088115  6/1982  United Kingdom ........... 360/130.23

OTHER PUBLICATIONS

Johnson, "Video Color Recording System", IBM Tech. Disc. Bul., vol. 9, No. 11, Apr. 1967, pp. 1584-1585.

Primary Examiner—Donald E. McElheny, Jr.
Attorney, Agent, or Firm—Ralph L. Mossino; Joel D. Talcott

[57] ABSTRACT

A method and apparatus for accurately positioning a transducing means along a desired path for recording parallel tracks of information being transmitted at varying rates. The apparatus also is arranged to control the transducing means so that accurately follows the tracks during reproducing at various tape transport speeds. In a magnetic recording/reproducing apparatus having transducing means operably supported by rotation means for scanning a magnetic tape along a plurality of adjacent sets of tracks, the rotation means including movable means carrying the transducing means and in response to electrical signals effecting movement of the transducing means in opposite directions from a home position in which the movement is generally transverse to the direction of the sets of tracks, wherein the improvement includes the signal producing means being operable to produce signals in response to the transverse position data for positioning the transducing means to either accurately simultaneously record a set of tracks along a desired path or simultaneously reproduce from the tracks and, during recording, to record additional sets of tracks subsequent to the completion of the preceding set of tracks along paths parallel to the selected path, the selected path being determined as a function of the speed and direction of transport of the tape.

44 Claims, 20 Drawing Figures

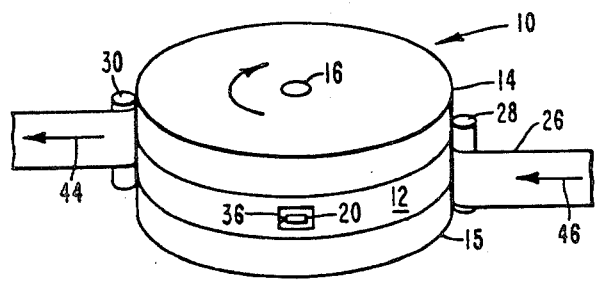
FIG_1
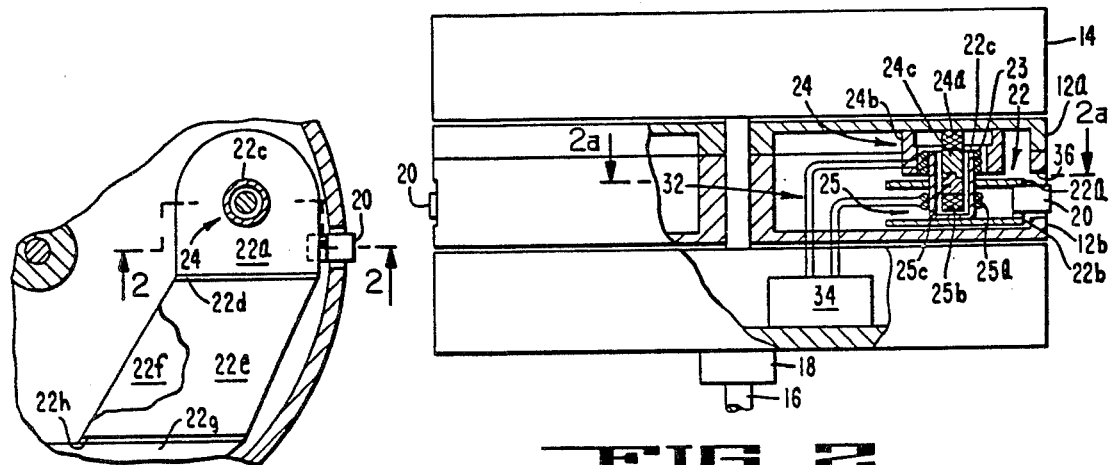
FIG_2a  FIG_2
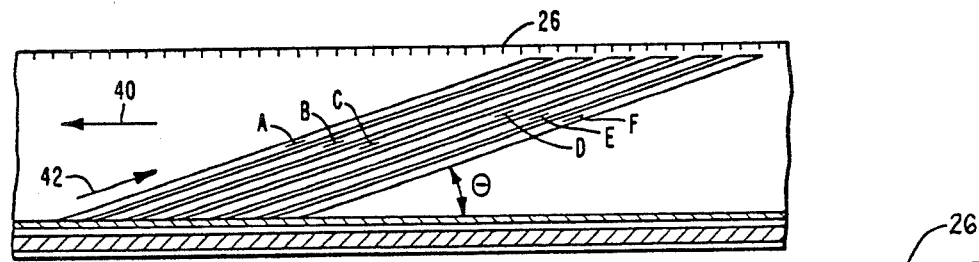
FIG_3
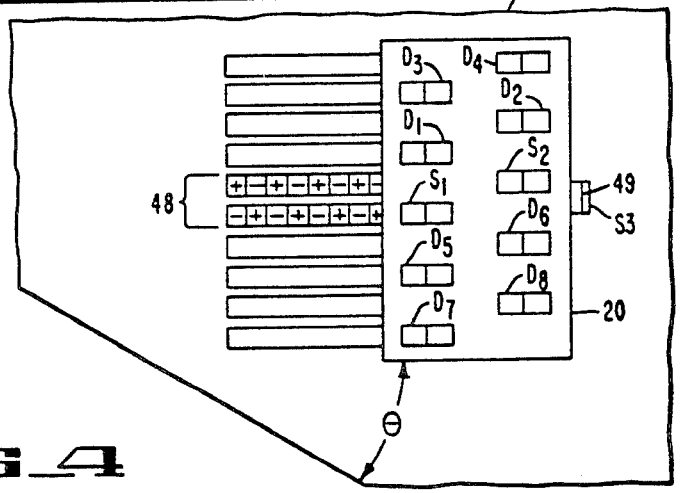
FIG_4

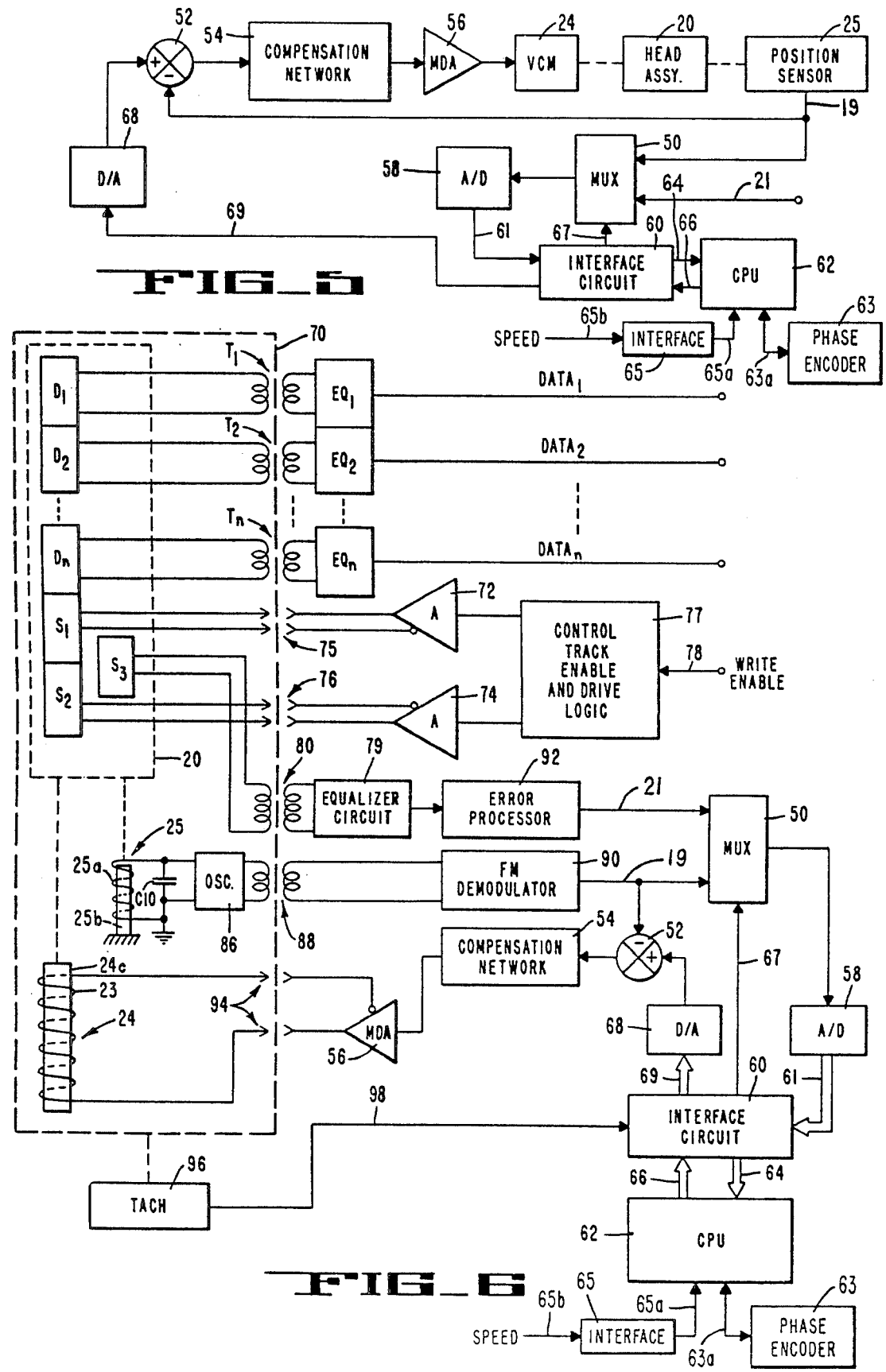

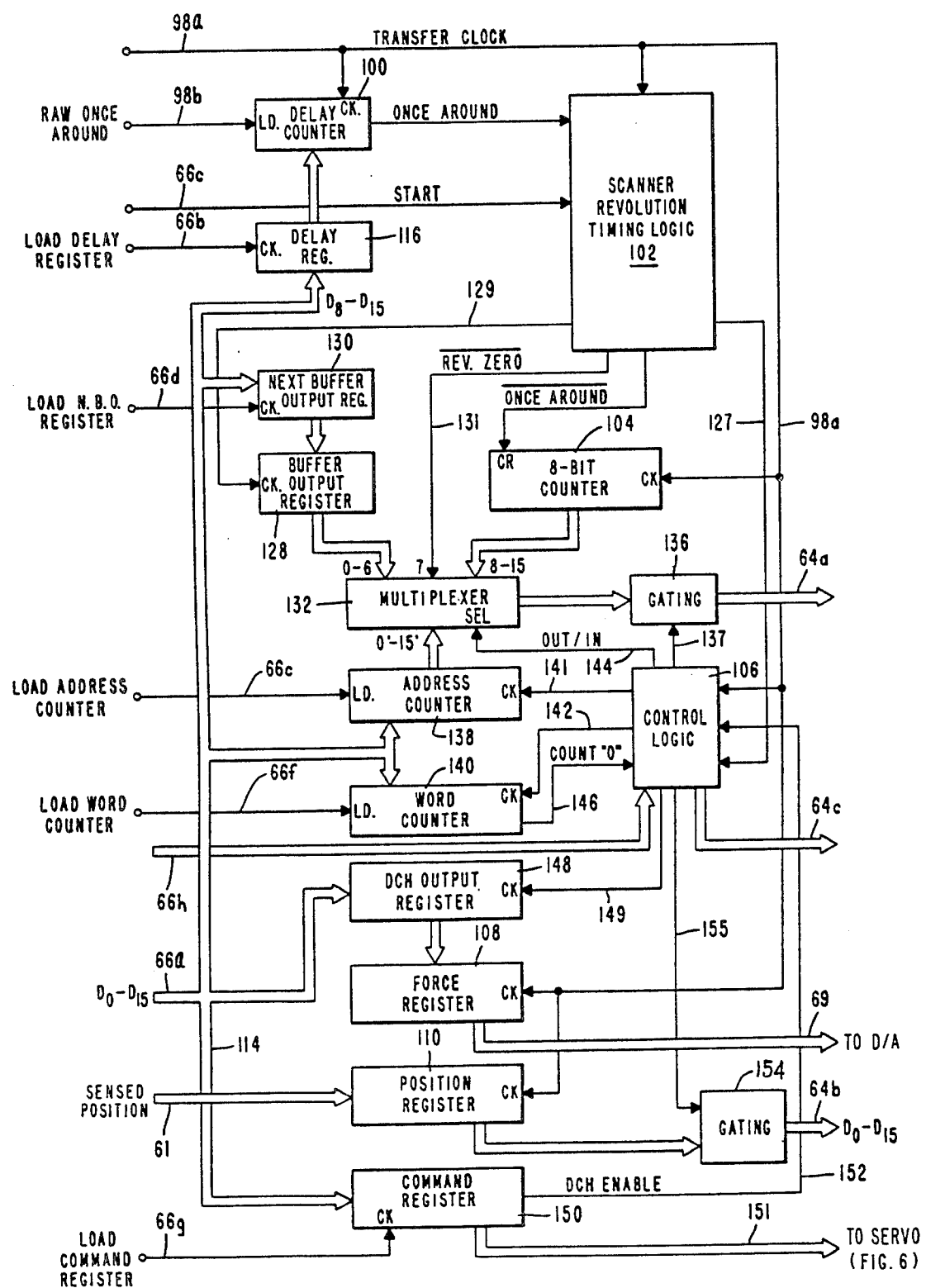
FIG_7

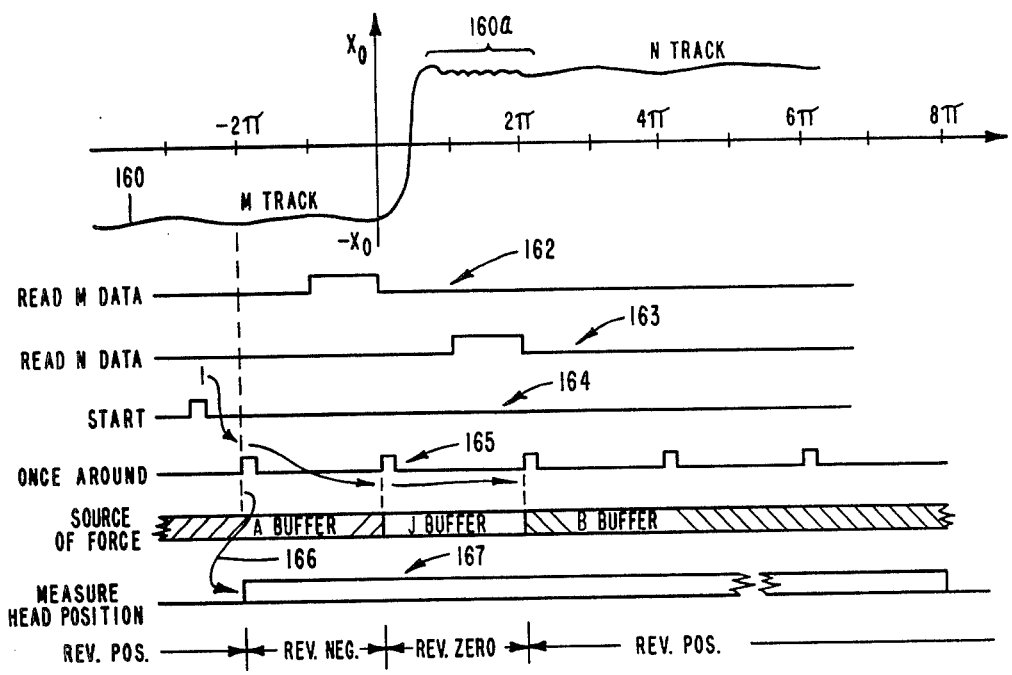
FIG_8
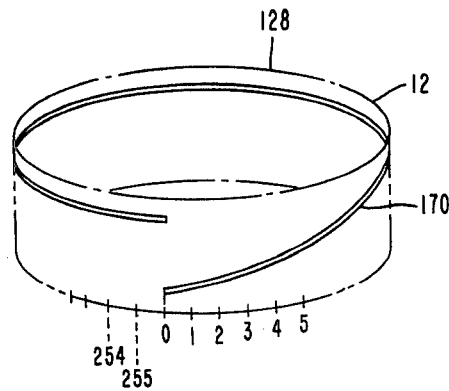
FIG_9
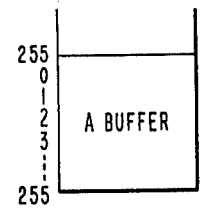
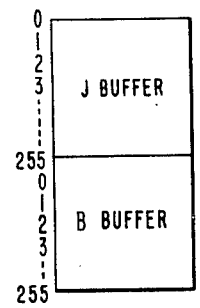
FIG_10

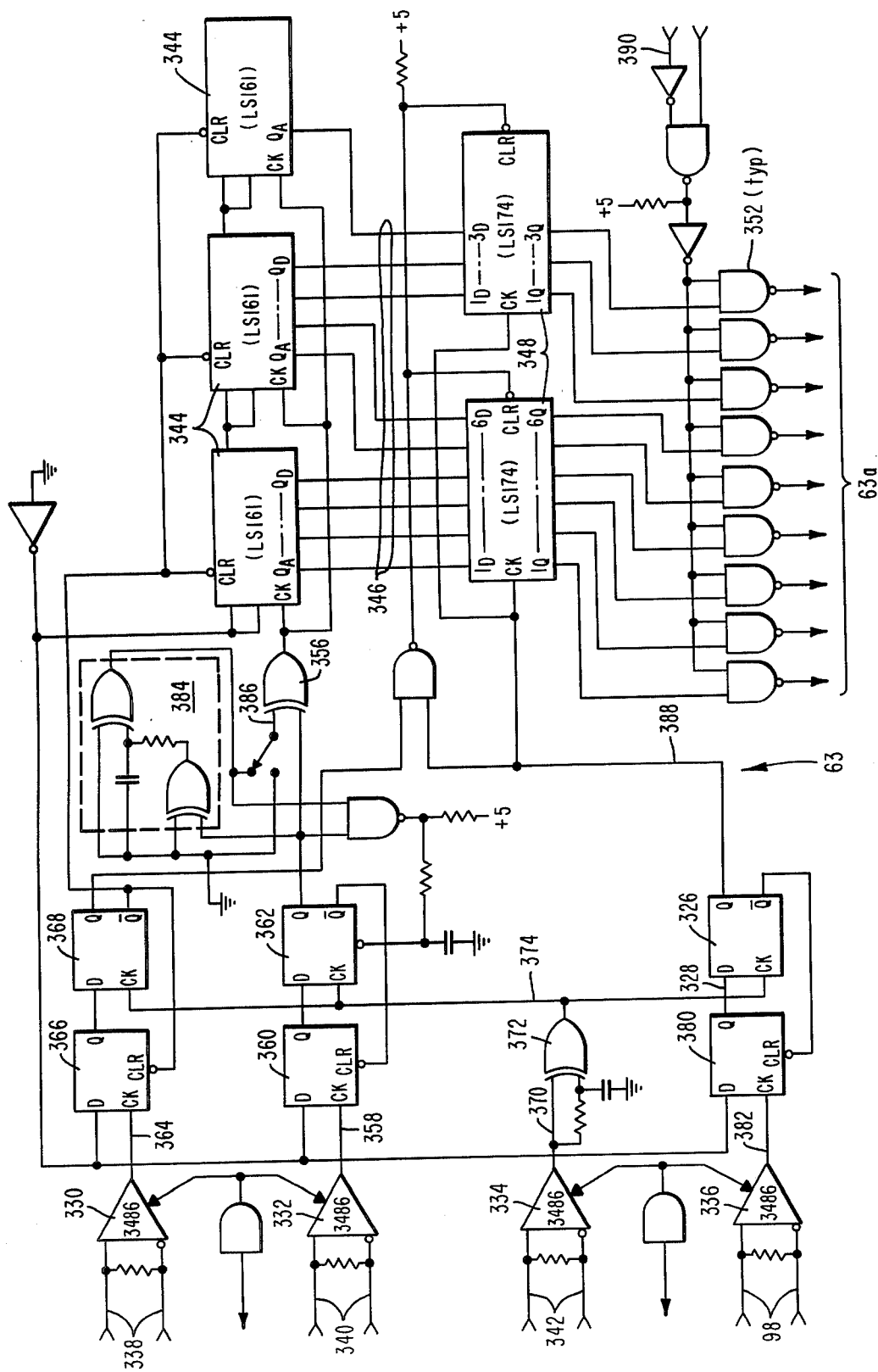
FIG_11

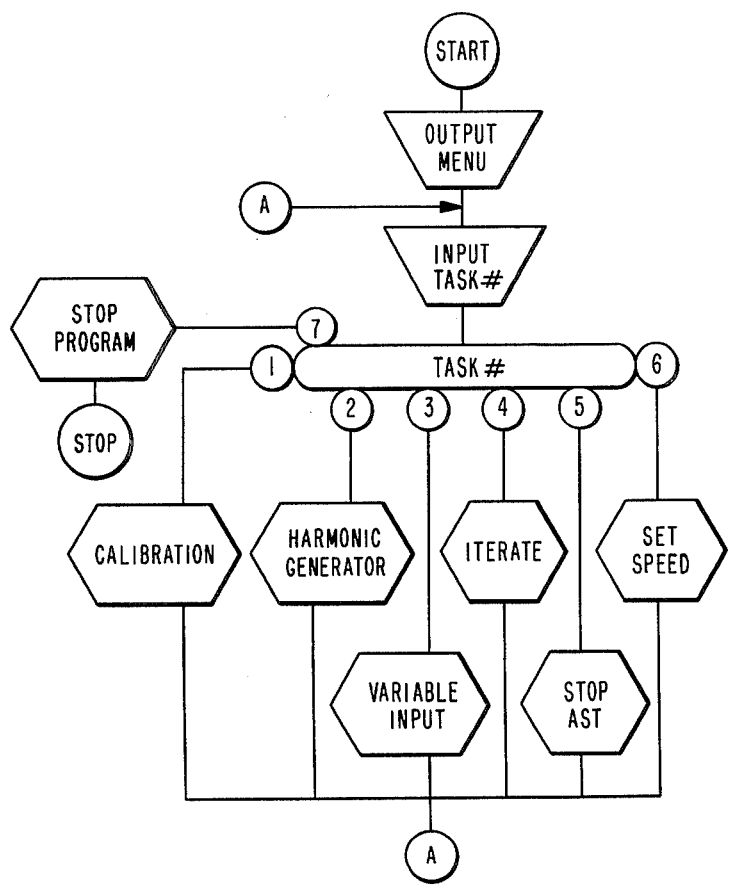
FIG_16
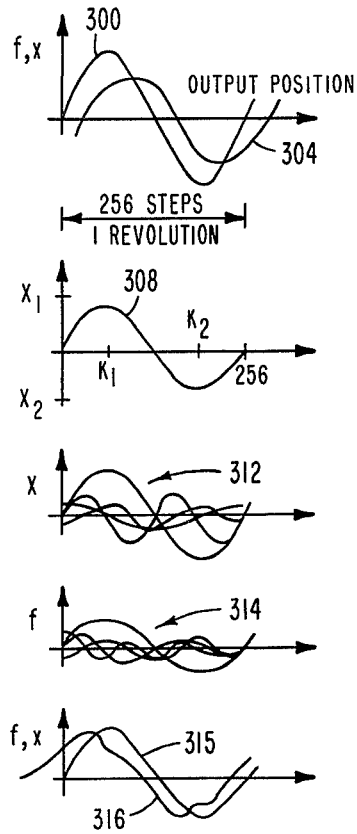
FIG_12
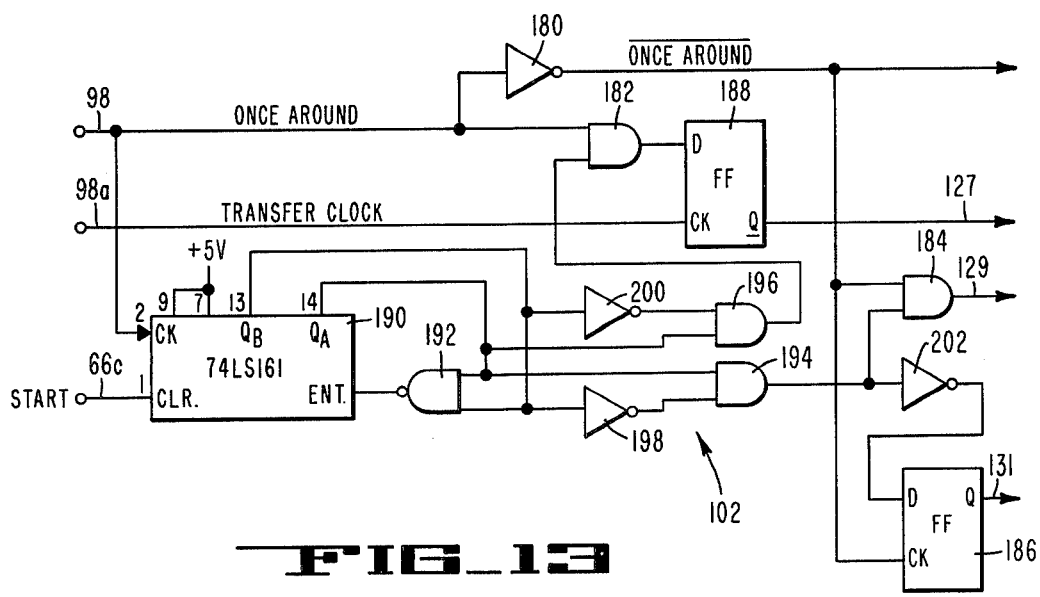
FIG_13

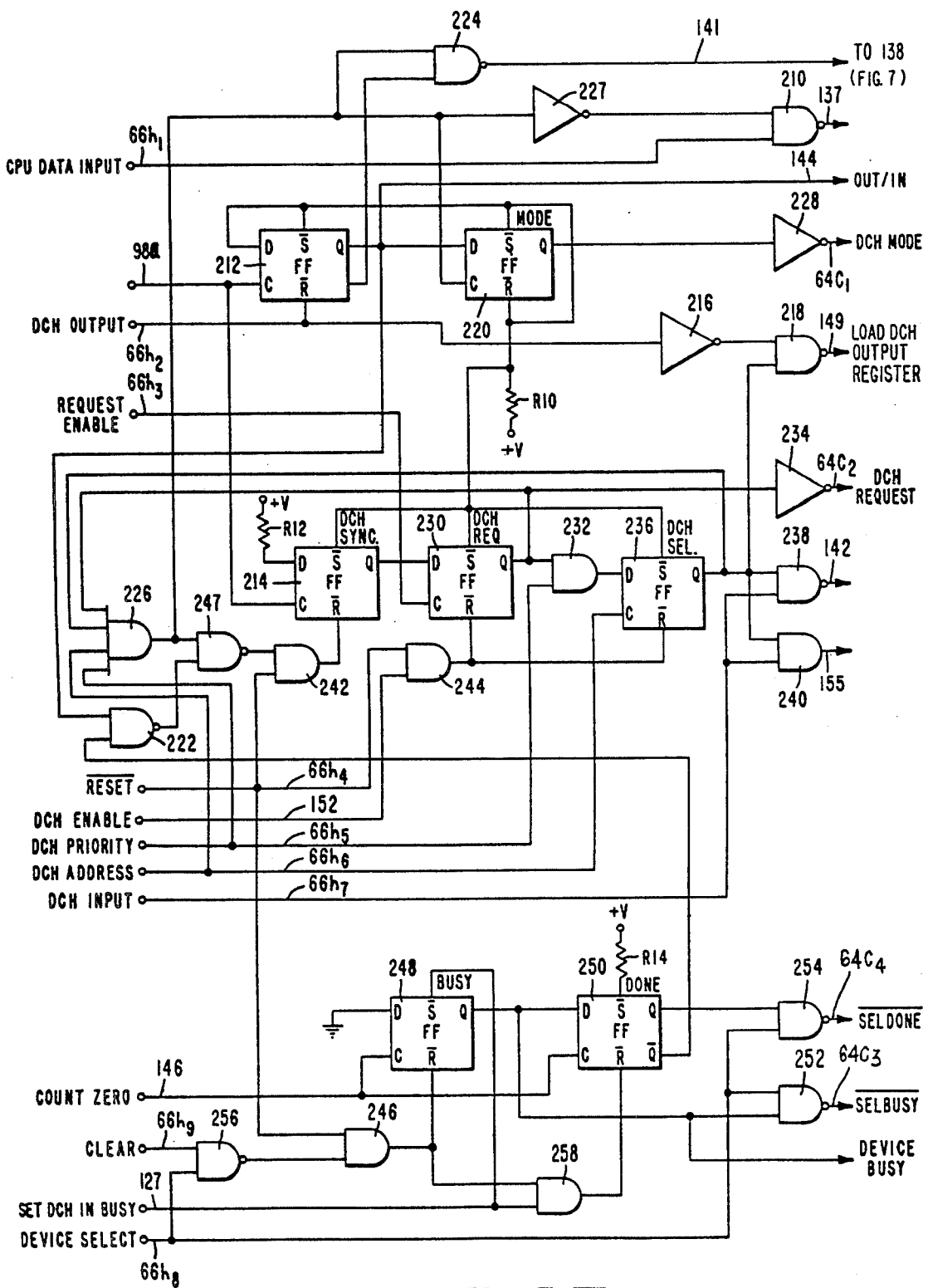
FIG_14

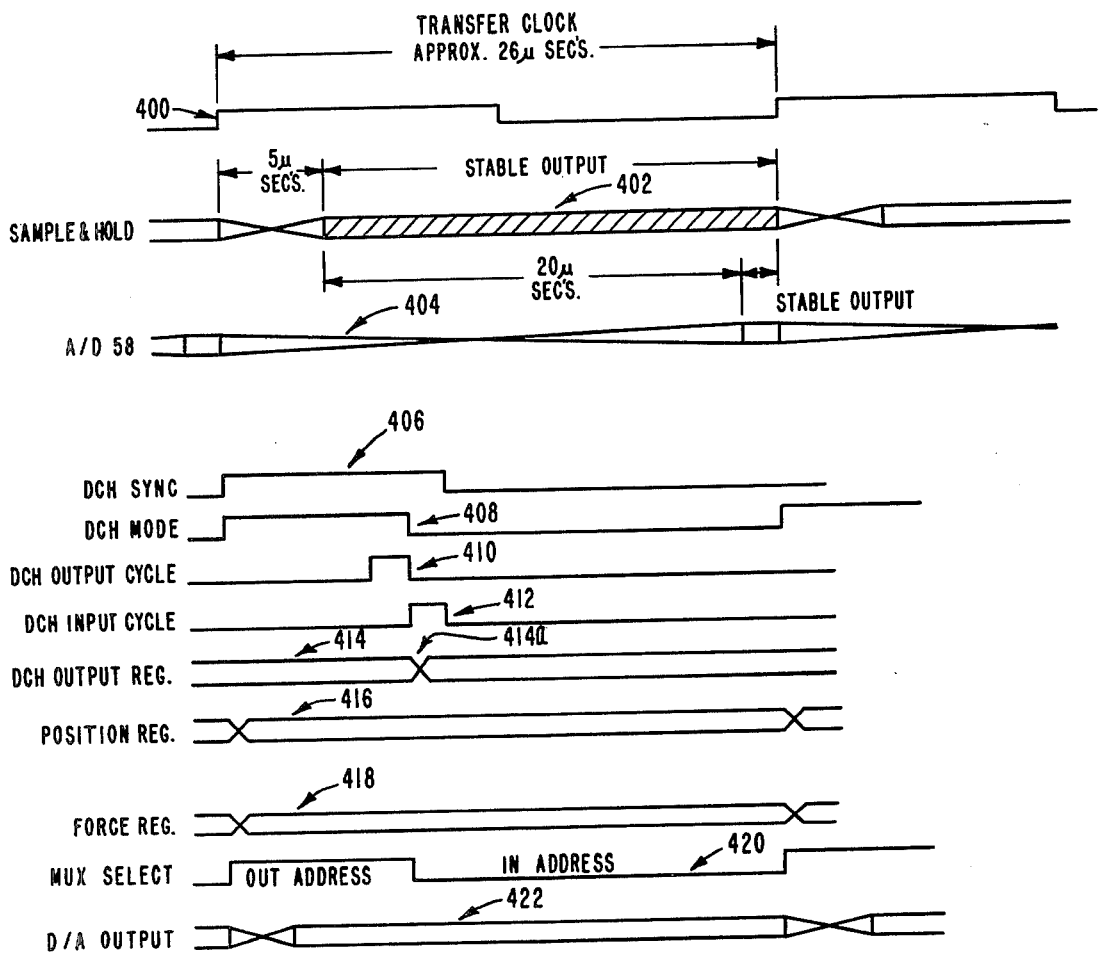
FIG_15

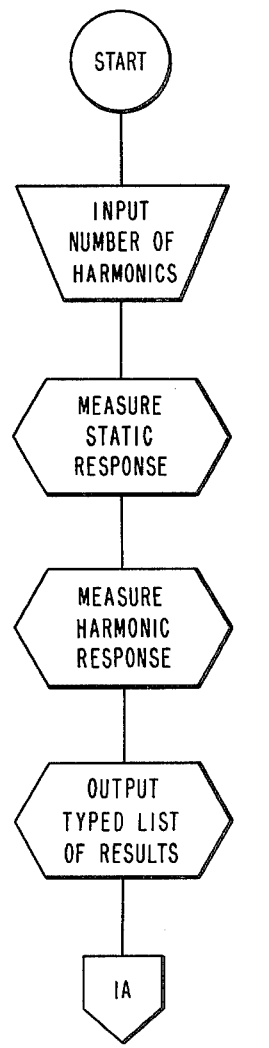
FIG_17
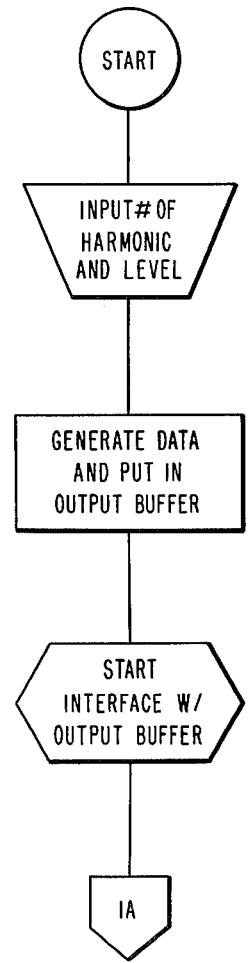
FIG_18

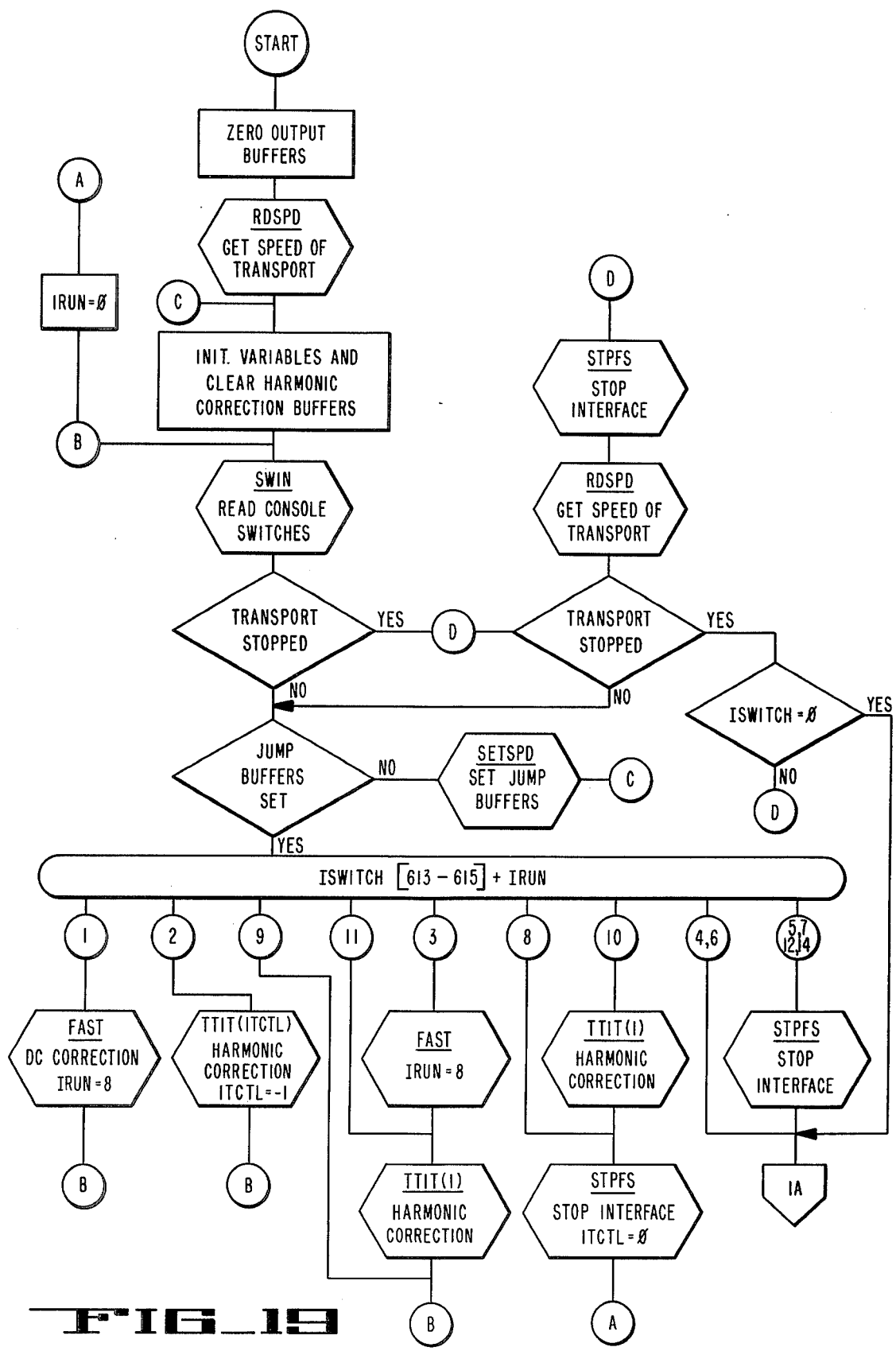
FIG_19

SERVO SYSTEM FOR POSITIONING A MOVABLE TRANSDUCING HEAD ASSEMBLY

This is a continuation in part of my prior application, Ser. No. 138,206, filed Apr. 7, 1980, now abandoned, which is a continuation of Ser. No. 956,816, filed Nov. 1, 1978, now abandoned.

CROSS-REFERENCE TO RELATED APPLICATIONS

Billy Richard Baker, Ser. No. 956,777, now U.S. Pat. No. 4,212,043, entitled "Magnetic Transducing Head Mount", and assigned to the same assignee as the present invention.

BACKGROUND OF THE INVENTION

The present invention generally relates to information recording and reproducing and, more specifically, to a recording and reproducing apparatus and a method for achieving high density recording of information transmitted at varying speeds.

The extensive research and development effort in the field of data recording and reproducing has resulted in many significant improvements in apparatus that record and reproduce information with respect to tape as well as other mediums. While there have been many different formats that have been developed for data recording and reproducing, the format wherein signals are recorded on magnetic tape as the tape is transported in a helix around a cylindrically-shaped tape guide drum has exhibited many distinct advantages in terms of relative simplicity of the tape transport drive and control mechanism, the necessary electronics involved, the number of transducing heads, and the efficient use of tape, in terms of the quantity of tape that is required for recording a given amount of material. By helically wrapping the tape around a tape guide as it is scanned by a rotating head, a single transducing head assembly can be utilized for reproducing or playing back the information that is recorded on the tape. When a single head assembly is used in a helical tape recording apparatus, two recognized alternatives are available for wrapping the tape about the tape guide for scanning by the rotating head, which are generally referred to as the "alpha" wrap and the "omega" wrap.

In apparatus employing the alpha wrap, the tape is introduced to the tape guide drum from one side and is helically wrapped completely around the drum so that it exits on the opposite side. It is referred to as the alpha wrap for the reason that the tape path about the tape guide drum generally conforms to the Greek symbol alpha ($\alpha$) when one views the tape path from above. In apparatus employing the omega wrap, the tape introduced to the tape guide drum along a path that is generally radial relative to the tape guide drum, is passed around a guide post that directs the tape into contact with the surface of the drum, is helically wrapped around the drum or a portion thereof, and is passed around another guide post so that it exits the drum also in a direction generally radial relative to the drum. The tape path about the tape guide drum generally conforms to the shape of the Greek symbol omega ($\Omega$) when it is viewed from above. Both of these wrap configurations are helical in that the tape is wrapped around the tape guide drum in a helical manner, with the tape exiting the tape path about the drum surface at a different axially displaced position relative to the position at which the tape enters the tape path. In other words, if the axis of the drum is vertically oriented, the tape leaves the drum surface at an axial position that is either higher or lower than the axial position at which it first contacts the surface. As the tape is passed around the tape guide drum, a rotating head assembly records data information signals along discrete parallel tracks that are oriented at an angle relative to the longitudinal direction of the tape so that a track length greatly in excess of the width of the tape can be achieved. The angular orientation of the recorded tracks is a function of both the speed of the tape being transported around the tape guide drum as well as the speed of rotation of the scanning head itself. The resultant angle therefore varies depending upon the relative speeds of both the rotating scanning head and tape being transported.

It should therefore be appreciated that if information signals are recorded on a tape at a predetermined angle which results from a precise rotational scanning head speed and tape transport speed, the subsequent reproducing of the information signal should be performed at the same speeds or the transducing head will not follow the track with precision. This assumes, however, that the head is rotating in the same equatorial plane. If the tape speed is changed during the reproduction of recorded information, such as reduced or stopped, the transducing head scans the tape at a different angle relative to the longitudinal direction of the tape, and therefore, will no longer precisely follow the recorded track and may even cross onto an adjacent track. The failure to precisely follow the track in registry during playback results in improper reproduction of the recorded information. While various prior art systems have been proposed to attempt to reduce such undesirable effects due to the lack of registry, many of such systems have not been entirely successful. Moreover, some prior art systems experience tracking difficulties during reproducing at the tape and head speeds that are intended to be identical to those that were used during recording.

One prior art system employs two transducing heads with switching means that are adapted to select the transducing head which has the maximum output. This approach suffers because neither head is always precisely on the recorded track throughout its length. As a result, the signal-to-noise ratio is poor. Other systems for reproduction of helically recorded signals have attempted to minimize the effect of mistracking by using synchronization pulse lineup techniques and the like, and by modifying the head-to-tape scan angle by changing the orientation of the axis of the tape guide drum about which the tape passes during recording and reproducing.

More recently, the above problems were overcome or substantially mitigated in a recording apparatus described in U.S. Pat. No. 4,165,523, entitled "Automatic Scan Tracking" by Richard A. Hathaway. Further description of this recording apparatus is set forth in U.S. Pat. No. 4,151,569, and U.S. Pat. No. 4,151,570. The apparatus described in these patents is directed to successfully achieving altered time base reference effects in the art of recording and reproducing information signals on a medium with a single transducing head. More particularly, such apparatus employs a cantilevered bimorph element anchored at one end and having the transducing head located on the second free end such that the head may be moved. This arrangement is satisfactory for single track recording and reproducing but cannot be moved sufficiently for a multiplicity of parallel tracks, such as, for example, 27 or more extremely narrow parallel tracks. An arrangement is therefore required that can move a multiple transducing head assembly a large distance, such as, for example, within the range of 0.02 to 0.04 inch. Moreover, if a multiplicity of transducing heads are employed in a single head assembly for recording and reproducing from a corresponding multiplicity of extremely narrow parallel tracks of data on a medium, accurate tracking becomes more critical and a different arrangement is preferred.

BRIEF SUMMARY OF THE INVENTION

Accordingly, it is an object of the present invention to provide an improved method and apparatus for achieving high density information recording and reproducing at varying rates.

More particularly, it is an object of the present invention to provide an improved method and apparatus of the foregoing type which effects precise repositioning and control of the tracking of a transducer with respect to a plurality of tracks along a medium of a recording and reproducing apparatus.

Furthermore, it is an object of the present invention to provide an improved method and apparatus of the foregoing type which achieves accurate repeatability with an altering time base reference in an information recording apparatus, without sacrificing the quality of the reproduced signal.

Another object of the present invention is to provide an improved method and apparatus of the foregoing type which operates at virtually infinitely variable relative head to tape speeds within predetermined limits, both in record and reproduce modes of operation.

Other objects and advantages will become apparent upon reading the following detailed description, while referring to the attached drawings.

GENERAL DESCRIPTION OF THE DRAWINGS

FIG. 1 is a perspective view of an omega wrap helical tape guide drum simplified for the sake of clarity and embodying the present invention;

FIG. 2 is a broken-away elevational view of the tape guide drum shown in FIG. 1;

FIG. 2a is a fragmentary cross-sectional plan view of the structure shown in FIG. 2, and taken on the plane of lines 2a—2a of FIG. 2;

FIG. 3 is an enlarged segment of magnetic tape having several sets of tracks recorded thereon;

FIG. 4 is an amplification of a portion of a set of the tracks shown in FIG. 3;

FIG. 5 is an overall block diagram of the system of this invention;

FIG. 6 is a more detailed block schematic diagram of the system of this invention;

FIG. 7 is a block diagram of the interface circuit illustrated in the diagram of FIG. 6;

FIG. 8 is a diagram illustrating the timing relationship for a position jump or reset of the magnetic head assembly;

FIG. 9 is a pictorial diagram of a helical track around the tape guide drum;

FIG. 10 is a map of buffers within the main memory of the central processing unit (CPU) utilized in the system embodying the present invention;

FIG. 11 is an electrical schematic diagram of the phase encoder portion of the circuitry shown in the block diagram of FIGS. 5 and 6;

FIG. 12 is a waveform diagram of a force data computation;

FIG. 13 is a schematic diagram of another interface the timing logic circuit within the central processing unit used with the system of this invention which is illustrated in FIG. 7;

FIG. 14 is a schematic diagram of the scanner revolution logic used in the circuit of FIG. 7;

FIG. 15 is a timing diagram illustrating operation of the circuit shown in FIG. 7;

FIG. 16 is a simplified flow diagram of the software program executed by the CPU during various operations of the apparatus;

FIG. 17 is a simplified flow diagram of the software program executed by the CPU during calibration of the apparatus; and FIG. 18 is a simplified flow diagram of the software program executed by the CPU during the generation of force data using various harmonics.

FIG. 19 is a simplified flow diagram of the software program executed by the CPU in performing the iteration task illustrated in FIG. 16.

DETAILED DESCRIPTION OF THE INVENTION

While the present invention will be specifically described in connection with a helical tape recording apparatus, it is equally applicable to other types of recording apparatus, such as a disc recorder or a longitudinal or quadruplex-type tape recorder. Additionally, while the present invention will be described in conjunction with the recording and reproducing of information on magnetic tape with the use of electromagnetic transducing heads, the present invention is also applicable to optical recorders or the like using appropriate recording mediums.

It should also be understood that the present invention is applicable to arrangements where the scanning head can move in either rotational direction and the tape can be introduced either above or below the exit path and moved around the tape guide drum in either direction. The relationships of head rotation, tape transport direction and manner of tape guiding, i.e., introducing the tape above or below the path of its exit, can represent up to eight different configurational relationships of which only one will be specifically described herein, as shown in FIG. 1 of the drawings.

Broadly stated, the present invention is directed to a method and apparatus for accurately positioning a transducing means along a desired path for recording parallel tracks of information being transmitted at varying rates and for reproducing recorded information at varying relative head to tape transport rates. In the event data recording at high rates and on a relatively continuous basis is to be achieved, the transport speed of the tape must be increased and, conversely, for data recording of data that occurs intermittently or at lower rates, the transport speed must be slowed down to maintain a relatively high density of recorded data. Since changing and tape transport speed changes the head-to-track angle as well, it is apparent that the transducing means must be appropriately moved a prescribed amount to record sets of tracks of information parallel to one another if the tape transport speed is different while recording different sets. The amount and direction of movement of the transducing means is a function of the relative head to tape transport speed and direction. During a reproduce mode of operation, the apparatus permits the tracks to be accurately followed, even though the relative head to tape transport speed is varied within wide limits.

The present invention comprises means for moving the transducing head assembly transversely relative to the longitudinal direction of the sets of tracks of the information and thereafter selectively alters or changes the position of the head assembly so as to correctly position the head to commence recording of another set of tracks parallel to the previously recorded set of tracks. It should be understood that during a constant speed recording operation, one complete revolution of the scanning head assembly causes the transducing head assembly to scan the tape to record a set of tracks at a predetermined angular orientation relative to the length of the tape and at the end of the scan of the tape, the movement of the tape causes the recording head assembly to be gradually displaced relative to the length of the tape a predetermined distance downstream in position to begin recording the next adjacent successive set of tracks. In this manner, the sets of tracks are recorded parallel to one another and, assuming the transport speed of the tape and the speed of rotation of the rotating drum carrying the record transducing head assembly is maintained constant, the set of tracks will have a constant spacing relative to adjacent sets of tracks, i.e., the track center-to-track center distance between sets of tracks will be substantially constant in the absence of geometric errors that can be introduced due to stretching, or other temperature or humidity-induced dimensional changes of the tape, or by faulty tensioning mechanisms in the tape transport or the like.

If, however, data transmitted at different rates is to be recorded, the head assembly is preferably deflected so as to record the data at the same angle on the tape regardless of the data transmission rate. Provision is made in the system of this invention to deflect the head assembly by a sufficient amount during the record mode of operation so as to always record the set of tracks at an angle corresponding to the undeflected head position at the highest relative head to tape speed of operation. Thus, the slower the information is transmitted, the greater the head assembly must be deflected to record the sets of tracks parallel to one another at an angle to the length of the tape that would be achieved at the highest relative head to tape speed of operation. The system also has provision for deflecting the head assembly in an appropriate manner so that during reproducing the head assembly will properly follow the set of tracks at the proper angle to obtain accurate reproducing of the data that is recorded on the tracks, even though the relative head to tape transport speed may be changed or varied during reproducing. Stated in other words, during reproducing operations the path that is followed by the transducing heads while the head assembly is rotating will have a precise angular relationship relative to the longitudinal direction of the tape (often referred to as "normal") during reproducing at any relative head to tape transport speed that is same as the path followed by the transducing head when the relative head to tape speed is normal and the transducing head is undeflected. By virtue of the fact that the widths of the tracks contemplated herein are extremely narrow, i.e., on the order of about 1 mil, variation of the head from a prescribed path required to follow the tracks accurately is extremely critical. The system of the present invention includes a computer means for generating the appropriate path control signals that the transducing means accurately follow the tracks during either recording or reproducing. During recording, the system generates force data signals for application to the deflecting head mounting mechanism carrying the transducing heads so that the tracks are recorded at the appropriate selected angle relative to the lengthwise direction of the tape even though the relative head to tape speed may change. Also, the system generates force data signals for application to the deflecting head mounting mechanism to cause the transducing means to accurately follow the recorded tracks during reproducing even when the relative head to tape transport speed is other than the normal relative head to tape transport speed.

Turning now to the drawings and particularly to FIGS. 1, 2 and 2a, there is shown a helical tape guide drum assembly, indicated generally at 10, with portions broken away from explanation purposes. The helical tape guide drum assembly and constituent parts thereof are described in greater detail in the above-cited U.S. Pat. No. 4,212,043. Briefly, for purpose of the present discussion, the drum assembly 10 is shown to comprise a rotatable center drum portion 12 consisting of an upper disc portion 12a and a lower disc portion 12b; and stationary upper and lower mandrel or guide portions 14 and 15, respectively. The center rotating portion 12 is fixed to a shaft 16 which is rotatably journaled in bearing 18 that is mounted on the lower drum 15. The shaft 16 is driven by a motor (not shown) operatively connected thereto in a conventional manner. The drum assembly 10 has a pair of diametrically opposed transducing head assemblies 20 carried by the rotatable drum portion 12 and is shown to be mounted on a head support element 22, which is disclosed in the above-mentioned U.S. Pat. No. 4,212,043. The head support element 22 comprises a pair of parallel plate assemblies 22a and 22b spaced apart and joined by a hollow tubular assembly 22c. As shown in FIG. 2a, the assembly 22 is joined by a pair of spring flexure hinges 22d to a pair of rigid parallel plate-shaped link members 22e and 22f, which in turn are joined to a solid base block 22g, forming part of the lower rotatable drum portion 12b, as by means of another pair of spring flexure hinges 22h. The flexure hinge assembly permits the head assembly 20 to be relatively free to move up and down in directions parallel to the drum axis. To drive the head assembly in such motion, there is provided a linear motor structure comprising a voice coil 23 mounted on an extending portion of the tubular assembly 22c, and driven by signals from a driving circuit 34 (to be explained further hereafter with reference to FIGS. 5 and 6); and, a stator comprising a permanent magnet assembly 24 consisting of a magnet 24a affixed to the upper rotating disc 12a, which is made of carbon steel, and outer and inner pole piece elements 24b and 24c which are also mounted on disc 12a so as to, respectively, circumvallate coil 23, and be circumvallated thereby. Also, a position sensing transducer 25 is provided for the head mounting assembly, comprising a coil 25a, also mounted on the tubular assembly 22c so as to circumvallate a ferrite member 25b that is mounted on an aluminum spacer element 25c extending from the pole piece 24b. The coil 25a is coupled to a sensing circuit within the driving circuit 34 so as to provide electrical signals indicative of the position of the head assembly 20, all of which will be described in detail hereinafter.

As best shown in FIG. 1, the drum assembly 10 is part of a helical omega wrap tape recorder which has magnetic tape 26 advancing toward the drum in the direction of the arrows as shown. More specifically, the tape is introduced to the drum surface from the right as shown in the drawing and is fed around a guide 28 which brings the tape into contact with the outer surface of the stationary lower portion 15 whereupon the tape travels around approximately 180° of the drum periphery until it passes around a second guide 30 which changes direction of the tape as it exits the drum assembly after it has been either recorded or played back.

The movable element 22 is effective to move the transducing head 20 mounted thereto in a vertical direction as shown in FIG. 2 in accordance with electrical signals that are applied to the voice coil motor 24 through conductors 32 from circuitry schematically illustrated by block 34. The head assembly 20 is mounted so as to extend approximately 1 to 2 mils beyond the outer surface of the rotating drum portion 12 through an opening 36 in the outer surface thereof. The element 22 is coupled to the voice coil motor 24 so as to suspend the transducing head assembly in the opening 36 for controlled positioning with respect to the magnetic tape. Thus, the movable element 22 is adapted to move up or down (when viewing the drawings in a conventional manner) and displace the transducing head assembly in response to applied electrical signals by means of the conductors 32.

If the transport speed of the magnetic tape, for example, is changed relative to the speed at which the information was recorded, the effective angle of the path followed by the head assembly 20 relative to the length of the tape 26 is changed and error correcting signals will be produced for the purpose of having the transducing head of the assembly 20 follow the track. Since the element 22 is movable in either direction, the tape can be transported around the tape guide drum assembly 10 at either a faster or slower speed relative to the record speed and the element 22 can position the head assembly 20 to follow the set of tracks being reproduced for either condition.

In accordance with an aspect of the present invention and referring to FIG. 3, a segment of tape 26 having a number of sets of tracks A through F recorded thereon is shown together with arrows 40 and 42 which illustrate the direction of tape motion around the tape guide drum assembly 10 and the direction of head scan relative to the tape itself, respectively. As stated hereinabove, the transducing head assembly 20 includes a multiplicity of individual transducing heads which record or reproduce a corresponding multiplicity of parallel tracks. The term "sets of tracks" as used herein refers to the multiplicity of tracks recorded by the transducing head assembly during a single pass across the tape. The orientation of the sets of tracks and the arrows shown in FIG. 3 coincide with what is produced by the movements of the rotatable drum portion 12 and tape 26 shown in FIG. 1 (see arrows 44 and 46). With a constant transport speed and angular velocity of the rotating drum portion 12, sets of tracks A through F will be substantially straight and parallel to one another at an angle $\theta$ (of about 17°, for example) relative to the longitudinal direction of the tape, with the rightward set of tracks shown in the drawing being subsequently produced during the recording operation. Since set B, for example, is recorded immediately after set A is recorded during constant head rotation and tape transport speeds, it should also be appreciated that if these speeds are maintained during the reproducing or playback operation, the transducing head assembly 20 will play back set B during a successive revolution immediately after having reproduced the information from set A. If, however, the transport speed is changed during the recording operation, the angle of the recorded sets of tracks would likewise change. The system of the present invention is also directed to maintaining a constant angle $\theta$ of the recorded set of tracks relative to the longitudinal direction of the tape during the record mode of operation even though the speed of the tape movement may change.

If conditions were ideal and no disturbances occur that cause mistracking, then the head assembly 20 simply follows the successive adjacent sets of tracks without adjustment during reproduction, since no error signals would be produced for transversely moving the head assembly 20 relative to the sets of tracks. Stated in other words, the transducing head is automatically in position to begin reproducing the subsequent set of tracks B after completing reproduction of the information from track set A. It should also be appreciated that even if the tape transport speed is varied during reproduction relative to the transport speed during record, and the angle of the path followed by the transducing head relative to the tape thereby changed, and the head is transversely moved to maintain accurate tracking through playback of the set of tracks, at the end of the set being scanned, the head is nevertheless in a position to begin scanning the next adjacent downstream set of tracks, i.e., set B, in the event the scan of track set A was ending. This occurs even when the tape is stopped or is traveling slower or faster than the transport recording speed.

To record information that is transmitted at varying speeds on a tape or other medium, it is necessary to vary or adjust the transport speed of the tape around the scanning head assembly. That is, to record the information at a high rate of speed, the transport speed is increased relative to a normal speed, and to record at a slow rate of speed, it is necessary to reduce speed of transport of the tape around the tape guide drum relative to the normal speed.

In accordance with the present invention, the apparatus can be placed in different modes of operation wherein the recording or reproducing of information can be effectively increasing or decreased by adjusting the transport speed of the tape, while appropriately controlling the operation of the scanning head assembly. It should be understood that the scanning head assembly moves at a constant rotational velocity and that the data that is either being recorded or reproduced occurs when the transducing heads are activated to perform the intended operating function. When the information is being recorded on a generally continuous basis, the tape transport speed is at its predetermined maximum and every revolution of the rotating scanning head assembly will record the sets of tracks during operation. This will generally be referred to as the normal transport speed during record.

However, if the data that is to be recorded occurs intermittently, then it may not be necessary for the recording to be continuously performed and in such case, there may be revolutions of the scanning head assembly where the transducing heads are not energized so that data is not recorded during those revolutions. In such case, the tape obviously does not need to be moved. If the data that is being provided to the recording apparatus is received at a relatively lower rate than is typically recorded and there is a desire for the recording apparatus to apply the data to tape at a higher density as would occur during continuous receipt of the data, for example, then the data may be incrementally stored in a suitable memory and thereafter read out during selective revolutions of the scanning drum assembly with the scanning drum assembly being controlled to record the tracks at a particular angular orientation relative to the lengthwise direction of the tape even though the tape is being transported at a slower than normal speed. The end result is the tracks are recorded at a density and and angular orientation that is the same as that obtained when data is received continuously for recording at a normal tape transport speed.

It should also be appreciated that data may be received by the recording apparatus in a continuous manner but at a data rate that is slower than could be recorded on the medium by the recording apparatus. In such event, the data may also be stored in a suitable memory and then read out for recording at a much higher data rate or density, with recording being done intermittently. Stated in other words, there may be rotations of the scanner head assembly wherein recording is not being performed, and it should be appreciated that in this situation, the tape would not be transported at the normal tape transport speed.

From either of these examples, it can be appreciated that a suitable buffer interposed between an incoming low data rate data stream or streams can appropriately be used with the recording apparatus and very high density recording can then be accomplished on tape which will result in a savings of tape surface which is an economic benefit. If recording is accomplished in the above-described manner, it should also be appreciated that the data could be reproduced at normal transport speed and the data reproducing continuously at the high density data rate typifying normal data reproduction at the normal tape transport speed.

It should also be appreciated that during reproducing, the high speed or full packing density data may be reproduced and again written into a buffer and while the data is read from the buffer and is sent onwardly to other apparatus or through some information channel at a lower data rate, the reproducing apparatus of the present invention can have the tape stopped and the reproducing transducing heads inactivated until the buffer is emptied, at which time the buffer is loaded again. In this latter type of operation, it should be appreciated that the tape transport speed would be less than the normal speed and there will be intermittent times when the reproducing heads are not activated. Also during this type of operation, the movable element 22 is necessarily provided with force data signals for accurately following the tracks, since at a reduced transport speed or even when the tape is stopped, the scan angle of the rotatable transducing head relative to the longitudinal direction of the tape is required to be different from the normal angle. From the foregoing examples, it is apparent that the apparatus is effective to automatically position the transducing head assembly to follow a set of recorded tracks from their beginning to their end, and thereafter adjust the position of the head assembly (if adjustment is needed) to the beginning of the proper set of tracks. In addition, the apparatus is effective to automatically maintain the same angle of the recorded sets of tracks during the record mode of operation even though the speed of the relative head to tape movement may change.

Also, the present invention provides for resetting or transversely moving the transducing head assembly at the end of the scan of a set of tracks to a position corresponding to the start of a set other than the next successive adjacent set under certain predetermined conditions. The decision to transversely move or adjust the head assembly depends upon the mode in which the apparatus is operating and whether the amount of transverse movement is within the predetermined limits that can be achieved. In other words, if the head assembly is moved its maximum amount in one direction, it can not be moved further in that direction. The total range of movement should be within practical limits determined by the characteristics of the element 22 and the voice coil motor 24.

An amplification of an exemplary single set of tracks on the tape 26 is shown in FIG. 4, along with a diagram of a typical transducing head assembly 20. The head assembly includes a multiplicity of individual transducing heads. Though 11 heads are shown, i.e., $D_1$ through $D_8$ and $S_1$ through $S_3$, it should be understood that additional heads could be included in the head assembly 20. In the exemplary embodiment described and illustrated herein, the heads $D_1$ through $D_8$ are read/write heads disposed for recording or reproducing information or data. The heads $S_1$ and $S_2$ are disposed for recording a pair of parallel tracks of control information referred to herein as control tracks 48, which control tracks are read by the control track read head $S_3$. The control tracks and associated heads are disposed for tracking alignment of the transducing head assembly 20 during the record and reproduce modes of operation. By way of example, each of the control tracks 48 is divided into a series of discrete states, with each state being oppositely polarized in an alternating fashion as shown. Also, the sequence of polarization is offset between each of the two control tracks. The read head $S_3$ has a gap 49 whose width dimension equals the distance between the centers of the adjacent control tracks 48 and nominally the read head is positioned with its gap extending from the center of one control track to the center of the second control track. Thus, the head $S_3$ will reproduce an alternating signal as the head assembly 20 scans the set of control tracks. When the head assembly drifts off track, the amplitude of the signal reproduced from the track in the direction of the drift will increase. This increase in amplitude is used by circuitry of the apparatus to reposition the head assembly back on track. Such an arrangement is explained in greater detail in U.S. Pat. Nos. 3,838,453 entitled "Track Following System For Magnetic Tape Recorder", and 3,534,344 entitled "Method and Apparatus For Recording and Detecting Information". While the abovedescribed scheme for the control tracks uses the series of discrete states with each state being oppositely polarized in an alternating fashion as shown and described, it should be appreciated that a separate signal of different frequency recorded in each of the tracks would provide similar error signal information.

Referring now to FIG. 5, a block diagram of the system of the present invention is illustrated wherein the voice coil motor (VCM) 24 is shown mechanically coupled to the transducing head assembly 20. The position sensor 25 is also mechanically coupled to the assembly 20. The output from the position sensor 25 is coupled by line 19 to one of two inputs of a multiplexer 50 and to one of two inputs of a summing junction 52. The output of the summing junction 52 is coupled to an input terminal of a conventional servo compensation network 54. The output of the compensation network 54 is coupled to an input of a motor drive amplifier (MDA) 56, and the output of the MDA is coupled to an input of the voice coil motor 24. Accordingly, it may be seen that the output of the sensor 25 forms a feedback network by means of the summing junction 52 for the motor drive amplifier driving of the voice coil motor 24, which feedback network is also referred to herein as an "inner loop".

As stated above, the control track read head $S_3$ provides a means for tracking the position of the heads 20 during playback operations. The signal reproduced by the read head $S_3$ is provided over line 21 to a second input to a multiplexer 50. The output of the multiplexer 50 is coupled to an input of an analog-to-digital (A/D) converter 58, and the output of the A/D converter is coupled to an input of an interface circuit 60 by means of a line 61. It is the function of the interface circuit 60 to transmit signals to and receive signals from a central processing unit (CPU) 62, which CPU may typically comprise a NOVA 1220 minicomputer as manufactured by Data General Corporation. Any other minicomputer, or a microprocessor of sufficient capability, may also satisfactorily be used in implementing the present invention. It is the function of the CPU 62 to compute and generate force data signals for moving the head assembly as a function of various input data and system parameters. Various information and control signals from the interface circuit 60 are transmitted to the CPU 62 by means of lines 64, and in a similar manner information and control signals from the CPU 62 are transmitted to the interface circuit 60 by means of lines 66. It is noted that in the description hereof a single line in a drawing may represent a multiplicity of lines.

In addition to the information and control signals that are provided to the CPU 62 from the interface circuit 60, a phase encoder circuit 63 also provides information via line 63a to the CPU for the purpose of providing data indicating the physical relationship between the heads-to-tape relative to the rotational position of the scanning head assembly, all of which is used by the CPU to properly calculate the path or trajectory of the transducing heads so that the proper path, during either recording or reproducing, is followed during operation. Additionally, an interface 65 which receives transport speed information via line 65b is applied to the CPU through line 65a. The data relating to tape speed is also used by the CPU 62 in computing the force data signals for driving each of the transducing heads along the appropriate and correct path during operation.

Another output of the interface circuit 60 is coupled to the select input terminal of the multiplexer 50, by means of a line 67, which effects selection of input signals from the sensor 25 or the control track read head $S_3$. Data from the CPU 62 transmitted on lines 66 to the interface circuit 60 are transmitted therethrough to a digital-to-analog (D/A) converter 68 on lines 69, and an output of the D/A converter is applied to the second input of the summing junction 52.

As will be described more comprehensively herein, the CPU 62 computes a series of binary numbers, which when taken sequentially determine the amount of deflection force (or force data) to be applied to the head assembly 20 during the recording or reproduction of a set of data tracks. The digital-to-analog converter 68 translates this sequence of binary numbers into an analog signal representative thereof, which analog signal is applied to the MDA 56 through the summing junction 52 and compensation network 54. The MDA 56 applies a current through the windings of the voice coil motor 24 to thereby effect the force deflection. The sensor 25 provides a means for feeding back information representative of the position of the voice coil motor 24 which information is supplied to the CPU 62 through the multiplexer 50, the A/D converter 58, and the interface circuit 60. Alternatively, the position of the head assembly 20 may be detected by the read head $S_3$ during a reproduction operation, which information is transmitted along a similar path. The CPU 62, interface circuit 60, multiplexer 50 and the converters 58 and 68 in combination with the read head $S_3$ and the sensor 25 form a second feedback network, which is sometimes referred to herein as an "outer loop".

To more fully appreciate the servo system of the present invention, reference is made to FIG. 6 wherein a more detailed block diagram of the servo system is illustrated. The rotating portion of the circuitry illustrated in FIG. 6 is shown within a dashed line 70. Included within this rotating portion of the circuitry is the voice coil motor 24, the sensor 25, and the magnetic head assembly 20 (also enclosed within dashed lines). The magnetic head assembly 20 typically comprises a multiplicity of read/write heads, $D_1, D_2 \ldots D_n$, the control track write heads $S_1$ and $S_2$, and the control track read head $S_3$. Though only three data heads are illustrated in FIG. 6, it is understood that numerous other heads could be connected in a similar manner. The control track write heads $S_1$ and $S_2$ are coupled to outputs of amplifiers 72 and 74 by means of slip rings 75 and 76, respectively; and, these amplifiers are driven by a control track enable and drive logic 77 in response to a write enable signal supplied on a line 78. Alternatively, rotating transformers may be used for coupling signals between the rotating and the fixed circuitry. In addition, optical signal couplers may be employed for either the slip rings or the rotating transformers.

The read head $S_3$ is coupled to an equalizer circuit 79 by means of a rotating transformer 80. Outputs of the data heads $D_1, D_2 \ldots D_n$ are coupled to equalization circuits $EQ_1, EQ_2 \ldots EQ_n$ by means of rotating transformers $T_1, T_2 \ldots T_n$, respectively. The outputs of the equalization circuits $EQ_1, EQ_2 \ldots EQ_n$ are coupled to data lines extending from the head assembly 20 to conventional read/write circuitry (not shown).

The sensor 25 typically comprises a coil 25a mechanically coupled to the head assembly 20, which coil is wound around a permanently fixed core 25b for magnetic coupling therebetween. Also, the coil is electrically coupled to input terminals of an oscillator circuit 86, and a capacitor C10 is coupled across these input terminals. One terminal of the capacitor C10 is coupled to ground potential. The output terminals of the oscillator 86 are coupled to one side of a rotating transformer 88. The oscillator 86 may typically comprise an integrated circuit, Model No. MC1648 as manufactured by Motorola Semiconductor. The stationary windings of the transformer 88 are coupled to input terminals of a conventional FM demodulator 90. In operation, the oscillator 86 causes the tank circuit formed from the coil 25a and the capacitor C10 to oscillate at a frequency determined by the position of the core 25b within the coil 25a. When the coil 25a is moved to different positions around the core 25b, the frquency of oscillation is changed, which change in frequency is coupled to the FM demodulator circuit 90 across the transformer 88. The output of this demodulator is coupled to one of two inputs of the multiplexer 50 and to the negative input terminal of the summing junction 52. Accordingly, such changes in the frequency of oscillation cause the FM demodulator 90 to provide a voltage indicative of the position of the head assembly 20, which is a function of the frequency of oscillation of the tank circuit. This signal is coupled through the multiplexer 50 to the input terminal of the A/D converter 58, transmitted in binary form to the interface circuit 60 along the lines 61, and then supplied to the CPU 62 on the lines 64.

Thus, the position of each of the head assemblies 20 relative to the drum assembly 10, i.e., the vertical position thereof, can be accurately measured and information regarding same provided to the CPU 62 for use in generating the necessary force data signals for controlling the head assemblies 20. This is done for controlling the head assemblies when they are in transducing relation with the magnetic tape, as well as during the period of each rotation where they are not in proximity to the tape and are being appropriately positioned to again be in transducing relation to the tape for a subsequent revolution. In the event it is necessary to move the head assemblies a relatively large distance, for example, resetting the transducing head assembly for placing it in position to reproduce sets of tracks, it may be necessary to generate force data signals for providing the large scale movement for such purpose. The vertical position information concerning the transducing head assembly 20, particularly, when out of engagement with the tape 26, is provided by the sensor 25 and circuitry associated with it.

The position of the magnetic head assembly relative to the recorded tracks on tape may also be detected during a reproduction operation by the control track read head $S_3$. The signals from the read head $S_3$ are coupled across the rotating transformer 80 to the input terminal of the equalizer circuit 79 and the output terminal of this equalizer circuit is coupled to the input of an error processor circuit 92, which functions to detect any tracking error of the head assembly. An exemplary error processor circuit is explained further in the aforementioned U.S. Pat. No. 3,838,453.

The output terminal of the processor circuit 92 is coupled to the second input terminal of the multiplexer 50. Accordingly, during a read operation the read head $S_3$ provides a signal indicative of the instantaneous position of the head assembly 20 with respect to the recorded tracks thereof, which information is converted to binary form by the A/D converter 58 and supplied to the CPU 62 along the same above-described path.

The drive signal for the voice coil motor 24 is derived in the CPU 62 in the form of binary numbers, which numbers are transmitted over the lines 66 to the interface circuit 60, and these binary numbers are converted to an analog signal by the D/A converter 68. The output of the D/A converter 68 is an analog signal coupled to the positive terminal of the summing junction 52 through the compensation network to the input of the MDA 56. The windings of the voice coil motor 24 are coupled to the MDA 56 by means of slip rings 94.

The speed of rotation of the moving assembly outlined by the dashed line 70 is detected by a tachometer 96. Output terminals of the tachometer 96 are coupled to the interface circuit 60 on lines 98 to thereby provide synchronization signals to be described further hereinafter.

Referring now to FIG. 7, a block diagram of the interface circuit 60 is shown in greater detail. The line 98a of the lines 98 from the tachometer 96 transmits a TRANSFER CLOCK signal or pulse from the tachometer to a clock input terminal (CK) of a delay counter 100. In one embodiment, the tachometer 96 provides 256 pulses per revolution of the rotating head assembly. Also, the TRANSFER CLOCK signal is applied to one of three input terminals of a scanner revolution timing logic 102, to the clock input terminal of an 8-bit counter 104, to an input terminal of a control logic 106, to the clock input terminal of a force register 108 and to the clock input terminal of a position register 110. Line 98b of the lines 98 transmits a signal identified herein as RAW ONCE AROUND to the load (LD) input terminal of the counter 100. The RAW ONCE AROUND signal is a single pulse generated for each revolution of the center rotating portion 12 of the drum assembly 10.

Lines 66a of the lines 66 from the CPU 62 are coupled to an internal data bus 114. The signals transmitted on the lines 66a comprise 16 data bits referred to herein as $D_0$ through $D_{15}$. The internal data bus 114 couples either certain ones or all of the data bit lines 66a to various registers or counters within the interface circuit 60 as will be described further hereinafter. Eight of the data bit lines, $D_8$ through $D_{15}$, of the bus 114 are coupled to input terminals of a delay register 116, which register is clocked in response to a data output control signal identified herein as LOAD DELAY REGISTER supplied on a line 66b from the CPU 62.

The output of the delay register 116 is coupled to input terminals of the delay counter 100. The data bits stored within the delay register 116 form a binary word representative of an amount of time delay, which binary number is loaded into the delay counter 100 in response to the RAW ONCE AROUND signal on the line 98b. The time delay is provided as a means of off-setting with precision an electrical-to-mechanical timing reference so as to accurately but simply align the operation of the various components of the system.

The counter 100 is decremented by the TRANSFER CLOCK signal, and when a count of the binary number loaded therein is complete, a carry out ($C_0$) output signal (identified herein as ONCE AROUND) is supplied to a second input terminal of the scanner revolution timing logic 102. Thus, the ONCE AROUND signal is equal to the RAW ONCE AROUND signal delayed by the amount of time required to count down the binary number loaded into the counter 100.

A third input to the logic 102 is supplied on line 66c from the CPU 62, and is a control signal identified herein as START. In response to the START signal being applied to the logic 102, a first output signal is supplied on a line 127 to an input terminal of the control logic 106. The signal supplied on the line 127 causes the control logic 106 to transmit DONE or BUSY status signals to the CPU 62 on the lines 64c. A second output signal from the logic 102 is supplied to the clock (CK) input terminal of a buffer output register 128 on a line 129, which signal causes the contents of a next-buffer-output register 130 to be loaded into the register 128. A third output signal from the logic 102 is supplied on a line 131 to an input terminal (terminal No. 7) of a multiplexer 132. This signal is referred to herein as REV.

ZERO, and is provided in response to the next ONCE AROUND signal incrementing a counter within the logic 102, which will be explained further hereinbelow. Yet another output signal, referred to herein as $\overline{\text{ONCE AROUND}}$, is supplied to the clear (CR) input terminal of the 8-bit counter 104. The output terminals of the counter 104 are coupled to additional input terminals (Nos. 8-15) of the multiplexer 132.

The eight most significant bit lines ($D_0$ through $D_7$) of the data bus 114 are coupled to input terminals of the next-buffer-output register 130. The clock input terminal of this register is coupled to a data output control signal line 66d from the CPU 62, which control signal is referred to herein as LOAD N.B.O. REGISTER. The output terminals of the register 130 are coupled to input terminals of the buffer-output register 128, and the output terminals of the register 128 are coupled to input terminals (Nos. 0-6) of the multiplexer 132.

The multiplexer 132 in this embodiment is a 16-bit multiplexer. The outputs of the register 128 comprise seven lines, the REV. ZERO output signal line 131 from the logic 102 comprises a single line, and the output of the 8-bit counter 104 comprises eight lines, all of which in combination form one set of the two selectable sets of 16-bit input terminals to the multiplexer. The 16-bit output terminals of the multiplexer 132 are coupled to a gating circuit 136, which is enabled by a signal supplied on a line 137 from the control logic 106. The output terminals of the gating circuit 136 are coupled to the lines 64a which are coupled to the ADDRESS BUS of the CPU 62.

The internal data bus 114 is also coupled to input terminals of a 16-bit ADDRESS COUNTER 138 and to a WORD COUNTER 140. The counter 138 is loaded in response to a data output control signal designated as LOAD ADDRESS COUNTER supplied by the CPU 62 on a line 66e, and this counter is incremented in response to a clock signal the from the control logic 106 supplied on a line 141. In a similar manner, the WORD COUNTER 140 is loaded in response to a data output control signal designated as LOAD WORD COUNTER supplied by the CPU 62 on a line 66f, and is decremented in response to a clock signal supplied on a line 142 from the logic 106. Output terminals of the ADDRESS COUNTER 138 are coupled to the alternate set of 16 input terminals (Nos. 0'-15') of the multiplexer 132.

In operation, the ADDRESS COUNTER 138 is loaded with data present on the bus 114 in response to the control signal on the line 66e, and is incremented by the clock signal supplied on the line 141 from the logic 106. Memory addresses are supplied through the multiplexer 132 to the gating circuit 136 in response to the state of an OUT/IN control signal supplied on a line 144 from the control logic 106. The WORD COUNTER 140 is decremented by the clock signals on the line 142 in response to each transfer of an address on the lines 64a to the CPU, and when the counter 140 reaches a count of zero, a COUNT ZERO signal indicative thereof is supplied to the logic 106 on a line 146. The COUNT ZERO signal causes the gating circuit 136 to be disabled, thereby inhibiting any additional transfer of data to the CPU.

The internal data bus 114 is also coupled to input terminals of a data channel (DCH) output register 148 and to a command register 150. The DCH output register 148 is loaded with data on the bus 114 in response to a clock signal from the control logic 106 on a line 149.

The output terminals of the register 148 are coupled to input terminals of the force register 108. The force register 108 is loaded in response to the transfer clock signals, and the output of this register is supplied to the D/A converter 68 (FIG. 6) on the lines 69. The binary numbers representative of the position to which the head assembly 22 must be deflected are supplied on the lines 69 from the force register 108, which binary numbers were computed by the CPU 62.

The command register 150 is loaded with data on the bus 114 in response to a data output control signal designated as LOAD COMMAND REGISTER, and supplied on a line 66g from the CPU 62. The binary numbers stored in the register 150 are provided on the lines 151 as control signals to the servo mechanism illustrated in FIG. 6, which signals will be explained further hereinbelow. In addition, a single data bit position of the command register 150 provides a DCH ENABLE signal on a line 152 to the data control logic 106. Additional control signals are applied to the control logic 106 on lines 66h from the CPU 62. In a similar manner, control signals are supplied to the CPU 62 from the control logic 106 on lines 64c.

The position of the head assembly as detected by either the control track read head $S_3$ or the sensor 25 (FIG. 6), which position signal is converted to a series of binary numbers by the A/D converter 58, is applied to input terminals of the position register 110 of the lines 61. The position register 110 is loaded in response to the TRANSFER CLOCK signal applied to the clock input terminal thereof. The output terminals of the position register 110 are coupled to a gating circuit 154, which gating circuit is enabled by a signal from the control logic 106 on a line 155. The output of the gating circuit 154 is coupled to the DATA BUS (not shown) within the CPU 62 by means of the lines 64b.

In general, the primary function of the interface circuit 60 is to route position data to the CPU 62 from the SENSED POSITION of the head assembly 20 for storage in a main memory, and to extract data from the CPU memory for conversion to a forcing signal for driving the voice coil motor 24. When position data is to be stored in the main memory, address locations for storing such position data are provided by the contents of the ADDRESS COUNTER 138, through the multiplexer 132 and the gating circuit 136. The initial address location for storage of the position data is determined by the CPU 62, which initial address is stored in the counter 138. Additional memory address locations, sequentially consecutive from the initial address location, are provided by incrementing the counter 138 with clock signals supplied on the line 141 from the logic 106.

The position data to be stored in the main memory is provided at the output of the gating circuit 154 on the lines 64b. In particular, each binary word (typically 16 data bits per word) of position data supplied on the lines 61 is temporarily stored in the register 110 before being transferred through the gating circuit 154 simultaneously with the address locations transferred through the gating circuit 136.

There are practical limits, however, to the size of main memories used with the CPU. Thus, a selection is made in the CPU for the maximum number of words of position data to be stored in the main memory at any one time. Of course, new data may be stored in the CPU memory by "writing over" data previously stored therein. The selection of the number of words of position data to be stored is represented by a binary number which is stored in the WORD COUNTER 140. Each time the ADDRESS COUNTER 138 is incremented, the WORD COUNTER 140 is decremented. When the word counter reaches a count of zero, the gating circuits 136 and 154 are disabled. Accordingly, only a preselected number of words of position data are stored in the main memory at any given time.

When the main memory is providing force data signals to drive the voice coil motor 24 so as to position the head assembly 20, data is extracted from the main memory at address locations provided by the opposite set of input terminals (Nos. 0–15) of the multiplexer 132. That is, the multiplexer 132 is selected by the level of the OUT/IN signal on the line 144 to transfer the combination of the outputs from the buffer output register 128 and the 8-bit counter 104 along with the state of the REV. ZERO signal on the line 131 through the gating circuit 136 to the lines 64a in the form of an initial main memory address for extracting the force data.

As previously mentioned and as should be appreciated from the foregoing detailed description, the force data is used to properly position the head assemblies 20 to follow the correct path during recording as well as reproducing. The position information is utilized by the CPU to generate the force data since the force data which moves the head assemblies is necessarily a function of the present position the head assemblies, as well as where they should be moved to be correctly positioned. The speed and amount of movement of the head assemblies is therefore determined by their present position as well as the desired position. The sense head $S_3$ is used to generate error information for use in controlling the transducing head assembly 20 so that it accurately follows the tracks while the transducing heads are scanning the tracks during reproduction therefrom, the position information provided by the sensor 25 is useful and necessary during the portion of each rotation of the transducing heads when they are off the tape and are being positioned for scanning a subsequent set of tracks during a subsequent rotation of the assembly 20. During a record operation, it should be appreciated that the position information is needed for the CPU to generate the forcing signals, particularly if the tape transport speed is less than normal and the prescribed or intended path of the transducing heads is that which would be produced if the tape transport speed were normal.

To more fully appreciate the operation of the servo system described thus far, reference is made to FIGS. 8, 9 and 10. FIG. 8 shows the timing relationship for a jump or reset of the head assembly 20 from a set of tracks M to an adjacent set of tracks N. Such a jump of the head assembly would occur while the head is not scanning the tape (i.e., off tape) and would be necessary once the head assembly has been deflected to its maximum deflection limit in one direction.

That is, if the head assembly is gradually deflected for each revolution of the rotatable transducing head assembly 20 and is always deflected in the same direction, it is necessary to jump or reset the position of the head assembly, once maximum deflection thereof has been reached. Waveform 160 illustrates the actual jump movement of the head assembly with respect to its angle of rotation. Note that the jump begins when the head assembly 20 is located approximately at a reference angle $\phi$ or 0° and is completed within approximately 180° of rotation of the assembly. However, due to the well-known phenomenon of inertia there will be an oscillatory motion of the head assembly. To mitigate this oscillation the forcing signals applied to the voice coil motor are modified to counteract the inertial oscillations. There still remains a minute amount of oscillatory motion, which is represented by portion 160a of the waveform 160.

Waveforms 162 and 163 represent the time at which data may be read from the tracks M and N by one transducing head assembly following an intervening jump movement. Waveform 164 represents the time at which the CPU 62 enables the hardware, which signal is also referred to herein as START. Waveform 165 represents the ONCE AROUND signal provided at the output of the delay counter 100. Following the START signal from the CPU 62, the next subsequent ONCE AROUND signal initiates operation of the servo system. As shown by the sequence arrow 166, measurement of the position of the head assembly 20 is initiated by generation of the waveform 167. Also, the first ONCE AROUND transition initiates the extraction of force data from JBUF buffer within the CPU main memory at REV. ZERO time to effect the jump from track M to N. The JBUF buffer contains force data for providing a jump from one set of tracks to another and is also especially adapted for the mass of a particular head assembly 20 so as to mitigate inertial oscillatory motion following a jump (as shown by portion 160a of the waveform 160). Note in FIG. 7 that the complement of the ONCE AROUND signal, namely, the (ONCE AROUND) signal, clears the 8-bit counter 104. The cleared state of this counter in combination with a first state of the REV. ZERO signal, and the contents of the register 128, provide the address to the JBUF buffer location of the main memory. The next subsequent transition of the ONCE AROUND signal clears the 8-bit counter 104. However, the state of the REV. ZERO signal changes, and this causes the issuance of another memory address location signal which controls the head assemblies for following the N set of tracks. The new address location contains forcing data computed by the CPU for driving the voice coil motor as the transducing head assembly scans the set of tracks N. If the address of the J buffer identifies a location in the buffer containing data indicating a jump from one set of tracks to another was required, then the voice coil motor is controlled by the voice data obtained from the J buffer to accomplish the jump as is desired. During the course of the execution of the jump, the A buffer is provided with another address, so that at the completion of the jump, the voice coil motor controlling the head assemblies is provided with the appropriate data to follow another set of tracks. However, during the execution of the jump using the data from the J buffer, if another address is not provided, then the CPU automatically obtains data from the B buffer which operates to keep the transducing head assembly from moving so that it will not undergo large excursions which would be undesirable and possibly damaging to the assembly. The B buffer is a circulating buffer whose contents are circulated at its output until a new address is provided for the A buffer or other similar output buffer.

The actual position of the head assembly is measured while the transducing heads are in transducing relation with the tape, i.e., for about 180°, or about ½ of each revolution of the transducing head assembly 20 and the tracking information is provided to input buffers. There are three input buffers, each of which receive 128 samples or words. While three input buffers are used, three are provided only because of synchronizing requirements with other routines performed by the CPU. The input buffers load position information regarding the head assembly or receive error information from the sense head S₃, the latter of which is typically used during the reproducing. After the 128th sample is received in an input buffer, an interrupt is provided which indicates that the data is received and ready for use, and the interrupt routine then begins executing to control the buffers.

Referring to FIG. 9, the rotatable center drum portion 12 is shown in phantom line. The trace of the head assembly movement during a jump is illustrated by band 170. In the illustrated embodiment, the center drum portion is rotated at 9,000 RPM and 256 sample intervals per revolution are provided. Consequently, each sample interval is approximately 26 microseconds. It should be appreciated that the inner loop described with reference to FIG. 5 has a bandwidth of about 4 kHz and a response time of approximately 1 millisecond and it is for this reason that the computer controlled outer loop is necessary to generate predicted correction of errors in the trajectory of the path followed by the transducing head assembly 20 that are caused by other factors such as stretching of the tape, bearing run out (which is sometimes referred to as wobble), changes in temperature and humidity, all of which affect the accuracy with which a track is followed by the head assembly during operation. The computer aided outer loop effectively samples and averages the error waveform signature during operation and finds the harmonic content of the error and uses the data to generate a correction waveform that effectively predicts the error on the basis of what has been determined and thereby causes the transducing heads that are carried by the deflectable head mounting assembly 22 to follow the proper path to obtain accurate reproducing.

FIG. 10 illustrates maps of the ABUF, JBUF and BBUF buffers within the main memory. Since there are 256 samples per revolution, each buffer contains 256 address locations for storing the 256 samples, or words, of the force data to be applied to the head assembly 20.

The broad organization of the software for the computer that controls the movement of the head assemblies is illustrated in FIGS. 16–19, with FIG. 16 providing the broad general operation of the CPU 62. The aforementioned Data General Nova computer operates with a main program of the system that is named MILE 3, which performs the interface between the operator and the hardware system comprising the overall apparatus. The computer displays prompts and requests the necessary parameter for each of seven separate tasks which will be hereinafter described. The computer has a front panel containing a number of switches as is standard for the Nova computer which controls the submodes of one of the seven tasks, namely the task named "iteration" which is the task that is used during normal operation in either the recording or reproducing modes. The available tasks that can be selected from the total number of tasks which are on the displaced directory or menu include the following: (1) calibrate; (2) output single harmonic; (3) change values for window, delay, N fit, gain; (4) iterate, including sense switches 13, 14 and 15; (5) stop control of automatic scan tracking; (6) set speed; and (7) stop program. The overall operation is shown in the diagram of FIG. 16, which illustrates that after the basic program is started, the output menu is displayed and an operator can designate one of the appropriate input paths, which is then carried out by the CPU. Most of the tasks are located "in line" in the MILE 3 system program, while certain major and other more complex tasks are located in subroutine modules which are shown in the following table.

Table 1

TTIT—harmonic correction
FAST—low frequence correction
JMPINIT—set up parameters for filling a jump buffer
JMPFILL—fill a jump buffer
SETSPD—set up speed constants
RDSPD—read speed from interface
SWIN—read sense switches
CMCAS—send a command to the interface
STCAS—start the interface and read/write data
RDCAS—read another set of data
FILON—integration of a set of real numbers
LMSQ—least mean square fit Upon start up, the apparatus is calibrated and this procedure is carried out using the flow chart shown in FIG. 17 in conjunction with the diagrams shown in FIG. 12. In this calibration stage, the CPU considers the inner loop or computer controlled loop to be a black box so that if a forcing function of sin $\omega t$ is applied to the input of the black box there will be a resulting displacement of $f = f_o R \sin(\omega t + \phi)$ where R is an attenuation factor and $\phi$ is the phase angle or lag of the output with respect to the input. During the calibration stage, sinusoidal forcing functions are used to drive the outer loop and the computer records the corresponding displacement of the system using the sensor 25. Fourier transforms are then used to determine the attenuation factor R and the phase delay $\phi$ for each harmonic of the once around frequency of the rotating drum assembly 10. The desired displacement is then analyzed by Fourier methods to determine the various component frequencies, including their amplitudes and phases. From the previously recorded response characteristics of the inner loop, it is then possible to determine the requisite forcing function in terms of its harmonics. These harmonics are then combined to form a truncated Fourier series and this forcing function produces the desired output of the inner loop.

The diagrams shown in FIG. 12 illustrate the various sine waves which are produced as a result of the Fourier analysis to generate the required forcing function to provide the desired output characteristic. The movement of the head assembly is generally depicted by the waveform 315 (and 308) and the forcing data that is required as a result of the analysis to move the head assembly in accordance with the movement depicted by waveform 315 is shown by the waveform 316. The desired pattern of movement of the head assembly 20 is represented by waveforms 308 and 315 and several harmonics of the computations are illustrated by waveforms 312 and 314.

Returning to FIG. 16, the task 2, which is that of outputting a single harmonic, results in the production of a sinusoidal forcing function at a selected harmonic of the rotating assembly's fundamental frequency. The amplitude of the forcing function may range from 0 to 32,767 bits in the illustrated embodiment. The amplitude corresponding to 32,767 bits is that which will approximately produce 40 mils of transducing head assembly movement, which corresponds to the full output range of the digital-to-analog converter. The data is put into a 512 integer array and the address of the array is output to the interface 60. The interface is commanded to continuously fetch data from the array until stopped and the interface may be stopped by invoking task 5 explicitly or implicitly by invoking any other task which uses the interface.

The third task which is that of changing the values of four parameters that are preset for a particular rotating assembly, and includes those labeled "window", "delay", "N fit" and "gain", can be changed and usually necessarily have to be changed if a particular rotating assembly is changed for a particular apparatus. Broadly stated, the "delay" parameter involves the controlling of a delay counter in the interface which adjusts for any angular misalignment of the heads relative to tape. Since the once around signal is derived from a tach pickup, its placement relative to head position is critical in determining when the head is on tape.

The "window" parameter represents that portion of the rotation of the head assembly wherein the transducing heads are in transducing relation with the tape. The window parameter number should not exceed 128 and represents the number of samples that are present in the input buffer as a result of the transducing heads being in transducing relation to the tape.

The "N fit" parameter represents the number of samples to perform a straight line fit for developing the off tape forcing function and this is nominally set at 40 samples. These 40 samples are located at the beginning portion as well as the end portion of the path that is followed while the transducing heads are on tape and the 40 samples are averaged to eliminate noise.

The "gain" parameter represents the number of units required at the input of the interface to force a movement of the head assembly so that the transducing heads move exactly 0.001 inch and is nominally set at 1600. Stated in other words, it also represents the change of input that is needed to drive the digital-to-analog converter to provide an output that effects a 0.001 inch displacement of the transducing head assembly 20. It is a conversion between the internal computer word and external physical movement of the head assemblies.

"Iteration" of the task number 4, is shown in the flow diagram of FIG. 19 and is the basic operating process which controls the movement of the head assembly with harmonic and D.C. correction, as well as with speed change strategy. As previously mentioned, the interface 60 works with two sets of buffers, i.e., the input and output sets of buffers, with the input set providing position or error data, while the output set contains the composite forcing function or force data signals which control the trajectory of the transducing heads during operation. Each revolution of the rotating head assembly 20 provides 128 points of data describing the 180° of revolution of the transducing head assembly 20, during which time the transducing head is in transducing relation with the tape and requires 256 points of data for controlling the head mounting assembly carrying the transducing heads. As defined, the sample points 0 through 127 occur when the heads are scanning the tape, and sample points 128 through 255 occur when the transducing heads are off tape.

The harmonic analysis occurs only when the interrupt service routine is idle, and both the harmonic analysis and interrupt service routines use both input and output data, so several buffers of each set of input and output buffers are used. All of the input and output buffers are either handled by the harmonic correction routine or the D.C correction routine but never by both. The harmonic correction routine contains logic that will accept and provide data using either routine. The harmonic correction routine also has the capability of operating in two modes, which are "stand alone" and "operation with a D.C. correction routine". In the stand alone mode, the routine performs the major steps in the order of their execution which are: inputting data, smoothing the input data, computing a straight line extending the error signals over the off tape portion, filtering and computing the forcing function signal coefficients, and calculating the sum of the number of harmonics of the forcing signal and applying the data to the output buffers for use in accomplishing the correction. The data is input as fast as computation time of the CPU allows, which is such that nonconsecutive revolutions of the head assembly 26 supply the input data. The data for ten revolutions is collected in a buffer and then averaged to filter out changes which occur at a rate faster than the update period. Only head on tape portion of data is useful to update tracking errors. Therefore the head off tape portion of each revolution is replaced by a straight line fit of the first and last end fit, each end fit comprising 40 samples as previously described. After the straight line fit for the off tape portion of each revolution of the transducing head assembly has been computed, a calculation of the Fourier transform forcing function coefficients is made for the specified number of harmonics that had been chosen and these coefficients, along with those calculated during the calibration step, are summed to generate the correction forcing function signals for the next period. The output buffer is then filled and passed to the RDCAS subroutine which enables the data to be accessed and used by the interface 60.

Whenever D.C. or offset correction is used, the control of the interface 60 is derived from the routine passed which performs the following tasks in order of their occurrence: acquisition of the data track, determining the type of jump to use, i.e., whether it is a small jump or large jump, sending a pulse to the signal system whenever data in the next revolution will be available, computing the straight line fit to determine the D.C. offset present in the error data, determining the correct input/output buffer to use in filling the output buffer with the sum present in the jump buffer, harmonic correction, predicted track location and the D.C. offset correction.

During the acquisition portion of the operation, the data from the phase encoder 63 must be synchronized with the prediction of the location of the track to prevent a false prediction. This is accomplished by using the first value of the phase encoder which equals zero and thereafter waiting until the next revolution of the transducing head assembly before calculating the slope of the data from the phase encoder. The slope of the values from the phase encoder for 128 sample points is used to generate a predicted value for the next revolution of the head assembly and is equal to the sum of the current reading and the calculated slope. The 128 sample points of input data are then used to calculate the least mean square fit.

After acquisition is obtained and the constants have been set for a given speed, only the predicted offset for the bias of the jump buffer is made each revolution of the rotating head assembly 20. Whenever the relative head to tape speed is changed, the main program calls a routine to prepare a new set of data for the jump buffers and the D.C. correction routine is stopped and restarted. The data for the jump buffers is constructed prior to operation by a set of routines defined as JMPI-NIT and JMPFILL for the speed specified by the register (ISPEED) read from the interface 65.

The jump buffers include two buffers, each describing a particular jump trajectory, which is preferably parabolic, which will cause the head assembly to be deflected so as to assume the appropriate beginning trajectory for following the new set of tracks at the proper slope, with the jump being accomplished using a trajectory that utilizes the least amount of energy. The first buffer has data for small jumps and the second has data for large jumps. If the selected speed does not require two sizes of jumps, then both buffers will contain the same data. Buffers with small jumps are always used unless the predicted value at the end of the recorded track is larger than a preset low limit. When the limit is reached, the buffer with the large jump is used. The data for the jump buffers are constructed neglecting the offset to reach the start of the next track and therefore the values contained in the buffers must have a value added which corresponds to the predicted end of the recorded track. This is defined as bias and is added to the offset correction prior to its application to the output buffer and then is subtracted before the start of the next revolution.

At relative head to tape speeds other than that at which the recording is made, there are always one or more revolutions of the transducing head assembly 20 when new data are not read. For example, at half speed, every other head revolution requires no new data and at quarter speed three out of four head revolutions requires no data. The determination of valid data is made using preset registers, which contain bit patterns that are unitarily coded and a repetitive count. The registers and the count are initialized to their preset values each time the count reachs its terminal state. The count is the reciprocal of speed and is decremented each revolution of the rotating head assembly. These registers are shifted left each revolution prior to determination of the signal validity so that whenever the register has a zero bit set, an appropriate action takes place. When the read action is taken, a new value for D.C. correction is then computed by performing a least mean square fit on the data.

With respect to the phase encoder 63 previously described with respect to the block diagrams of FIGS. 5 and 6, a diagram of the circuitry which comprises the phase encoder 63 is shown in FIG. 11 and includes four separate differential line receivers at the left thereof, identified as 330, 332, 334 and 336. The driver 330 has an input line 338 which contains a tape frame signal, which is provided by conventional circuitry and defines when the beginning of a track occurs on tape. Lines 340, which are the input lines to the driver 332, contain a tape reference signal when is at rate of 256 times the tape frame rate and the driver 332 provides an output that is 256 times the frame rate. Input lines 342 are applied to the driver 334 and contain a signal which is 512 times the once around tachometer rate. The one time tachometer signal from input lines 98 are applied to the driver 336. The tape frame and tape reference signals on inputs 338 and 340 define when a track begins on tape and the signal on line 98 identifies the rotating head assembly zero position, with the input line 342 having a signal that is 512 times the tach rate signal.

Essentially, the phase encoder circuitry is a simple counting circuit which provides information to the CPU 62 via line 63a that is an indication of how far the rotating head assembly zero position is misaligned relative to the track to be scanned. This count reflects the amount of misalignment that is present in the system. Stated in other words, the tape frame signal zeros the counter and a multiple of the tape reference signal clocks the counter until the zero position occurs, during which time the count present in the counters is transferred to a register for loading into the CPU when requested.

The count that is therefore provided to the CPU is an indication of the degree of error between the start of a track and the zero position of the rotating head assembly. It is preferred for accurate tracking that the beginning of the track coincide with the point at which the transducing head comes into transducing relation with the tape so as to accurately follow the track during its scan. The amount of error also provides a definite count which is a true indication of the degree of error that is present at the time and the CPU can utilize this information to generate force data signals for correcting the tracking error. What is desired as a result of the signals from the phase encoder is to essentially measure the height of a track relative to the edge of a tape. This can be done in two ways, i.e., by measuring the head position, which is a function of the angular position during a revolution, or by measuring the track position on tape, which is a function of the longitudinal position of the tape. If the measured distance of the head from the edge of tape, which is essentially a measurement of the rotational position of the transducing head, has subtracted from it the measured distance of the track from the edge of the tape, which in itself is the measurement of the longitudinal position of the track, then the result of the subtraction is the distance of the head from a track.

The circuitry of FIG. 11 therefore provides a measurement of the distance of the transducing head from the beginning of the track until it reaches the tape, i.e., at its zero position, and this count is used by the CPU to generate the error correction forcing signals. Turning to FIG. 11, the circuit has a number of integrated circuits 344 which together comprise a 9-bit counter, which has output lines 346 extending to two integrated circuits 348 that comprise a 9-bit register having output lines 350 extending to bus drivers 352, whose output lines 63a extend to the CPU 62. The counter 344 is clocked by line 354 which is the output of an EXCLUSIVE OR gate 356. The output of the receiver 332 is provided on line 358 which is connected to a D flip-flop 360 that in turn is connected to another D flip-flop 362.

The tape frame signal from the receiver 330 appears on line 364 that clocks a D flip-flop 366 which in turn is connected to another flip-flop 368. The combination of flip-flops appropriately times the clock signal so that the counter 344 is stabilized before it is clocked, as is conventional.

The scanner reference signal is provided on line 370 from the receiver 334 and is gated through an EXCLUSIVE OR gate 372 to line 374 which clocks the flip-flops 362 and 368 as well as another flip-flop 376 that is provided with a D input on line 378. This D input is provided by a flip-flop 380 that is clocked at the occurrence of the tach pulse from the receiver 338 on line 382. A pair of EXCLUSIVE OR gates 384 and associated circuitry adjacent thereto comprise a times two multiplier, which effectively multipliers the tape reference signal by two and applies it to input line 386 of the EXCLUSIVE OR gate 356. Thus, the frequency of the signal on line 354, which clocks the counters, is a function of the tape reference signal and this signal will increment the counters 344 as desired.

The occurrence of the tape frame signal on input 338 has the effect of clearing the counters 344 as well as the register 348. After being cleared, the counters 344 are clocked by movement of the tape. The count state of the counters indicates the distance between the beginning of the track associated with the tape frame signal and normal rotational plane of the transducing head assembly. The counters 344 count clock pulses until the tachometer signal is produced and applied to input lines 98. This results in the flip-flop 376 providing a signal on line 388, which is applied to the registers 348 and clocks in whatever is present on the output lines 346 of the counters 344 at the time.

The CPU issues a SELECT signal on input line 390. This signal enables bus drivers 352 so that the data from the registers 348 is applied to the bus lines 63a of the CPU 62 as is desired.

From the foregoing description, it is seen that the beginning of the track is signaled by the occurrence of the tape frame signal on line 338, which clears the counters and enables them to begin counting until the tachometer signal is received, at which time the accumulated count in the counters is applied to the registers 348 for transmission to the CPU 62 when requested.

The scanner revolution timing logic 102 is illustrated in greater detail in FIG. 13. The ONCE AROUND signal from the delay counter 100 (FIG. 7) is supplied as an input to an inverter 180 and to an input to an AND gate 182. The output of the inverter 180 provides the ONCE AROUND signal, which signal is also coupled to an input terminal of an AND gate 184 and to the clock (CK) input terminal of a flip-flop 186. The output of the AND gate 182 is coupled to the data (D) input terminal of a flip-flop 188. The transfer clock signal supplied on the line 98a is coupled to the clock (CK) input terminal of the flip-flop 188. The not true output terminal ($\overline{Q}$) of the flip-flop 188 is coupled to the line 127, which line is coupled to an input terminal of the control logic 106 (FIG. 7).

The ONCE AROUND signal is also coupled to the clock (CK) input terminal of a counter 190. The counter 190 may typically be a semiconductor device, model number 74LS161 or its equivalent. The START signal supplied on the line 66c is provided to the clear (CLR) input terminal of the counter 190. A first data output terminal ($Q_A$) of the counter 190 is coupled to an input of a NAND gate 192, an input of an AND gate 194, and to the first of two inputs of another AND gate 196. The second data output terminal ($Q_B$) of the counter 190 is coupled to the inputs of inverters 198 and 200. Also, the $Q_B$ data output terminal of the counter 190 is coupled to the second input of the NAND gate 192. The outputs of the inverters 198 and 200 are coupled to second inputs of the AND gates 194 and 196, respectively. The output of the AND gate 196 is coupled to the second input of the AND gate 182, and the output of the NAND gate 192 is coupled to the enable (ENT) input terminal of the counter 190. The output of the AND gate 194 is coupled to the input of an inverter 202 and to the second input of the AND gate 184. The output of the inverter 202 is coupled to the data (D) input terminal of the flip-flop 186. The output terminal of the AND gate 184 is coupled to the line 129, which is coupled to the clock (CK) input terminal of the buffer output register 128 (FIG. 7). The true output (Q) terminal of the flip-flop 186 is coupled to the line 131, which transmits the REV. ZERO signal to the multiplexer 132 (FIG. 7).

In operation, the START signal on line 66c clears the counter 190 and thereby cause both data outputs $Q_A$ and $Q_B$ to go to a low level. This enables the NAND gate 192 to enable the counter 190 to count. Also, the AND gate 182 is disabled since the AND gate 196 is disabled by the low signal level provided at the $Q_A$ output of the counter 190. Accordingly, the signal level on the line 127 will remain at its previous state. The AND gate 194 is also disabled, which enables the inverter 202 to thereby set the flip-flop 186 on the next negative transition of the ONCE AROUND signal. At this time, the signal level on the line 131 is set at a high level. The disabling of the AND gate 194 also disables the AND gate 184, thereby causing the signal level on the line 129 to be low. The occurrence of the first ONCE AROUND signal on line 98 following the START signal clocks the counter 190, which will causes the data output $Q_A$ to go to a high level. At this time, the data output $Q_B$ remains at a low level. Accordingly, the AND gates 196 and 182 are enabled, which sets the flip-flop 188, thereby causing the signal level on the line 127 to go to a low level. The AND gate 194 also is enabled upon the occurrence of the first ONCE AROUND signal, which also enables the AND gate 184 in combination with the change in level of the ONCE AROUND signal at the output of the inverter 180. This causes the level of the line 129 to go high on the trailing edge of the ONCE AROUND signal. The inverter 202 is now disabled which resets the flip-flop 186 causing the signal level on the line 131 to go to low which is, the onset of the REV. ZERO signal provided to the multiplexer 132 (FIG. 7).

The next subsequent ONCE AROUND signal supplied to the clock input of the counter 190 via line 98 causes the $Q_A$ data output to go low and the $Q_B$ data output to go high. Accordingly, the outputs of the inverters 198 and 200 go low and disable the AND gates 194 and 196. This causes the flip-flop 188 to reset, which causes the signal on the line 127 to go to a high level. The disabling of the AND gate 194 also disables the AND gate 184, thereby causing the signal on the line 129 to go to a low level.

As stated hereinabove, the CPU 62 may be a NOVA minicomputer as manufactured by Data General Corporation. If such a minicomputer is employed, one form of the control logic 106 is described and illustrated in a manual entitled "How To Use The Nova Computers" by Data General Corporation of Southboro, Mass. Briefly, for purposes of the present discussion, reference is made to FIG. 14, wherein the control logic 106 is shown in greater detail.

A CPU DATA INPUT control signal from the CPU 62 is supplied on line $66h_1$ of the lines 66h, which signal line is coupled to one of two inputs of a NAND gate 210. The transfer clock signal line 98a is coupled to the clock (C) input terminals of flip-flops 212 and 214. The data (D) and set-not ($\overline{S}$) input terminals of the flip-flop 212 are coupled to a source of positive potential (+V) through a resistor R10. Another control signal from the CPU 62, which control signal is designated DCH OUTPUT, is supplied on line $66h_2$. The line $66h_2$ is coupled to the reset-not ($\overline{R}$) input terminal of the flip-flop 212 and to the input of an inverter 216. The output of the inverter 216 is coupled to one of two inputs of a NAND gate 218. The true (Q) output terminal of the flip-flop 212 is coupled to the data (D) input terminal of another flip-flop 220, to the line 144, which transmits the OUT-/IN select signal to the multiplexer 132 (FIG. 7), and to one of two inputs of a NAND gate 222. The not true ($\overline{Q}$) output terminal of the flip-flop 212 is coupled to one of two inputs of a NAND gate 224. The output terminal of the NAND gate 224 is coupled to the line 141, which transmits the clock signal to the address counter 138 (FIG. 7). The set-not ($\overline{S}$) and reset-not ($\overline{R}$) input terminals of the flip-flop 220 are also coupled to the source of positive potential through the resistor R10.

The flip-flop 220 is designated herein as the MODE flip-flop, and the clock (C) input terminal thereof is coupled to the output of an AND gate 226, which will be explained further hereafter. The true (Q) output terminal of the flip-flop 220 is coupled to the input of an inverter 228, and the output of the inverter 228 is coupled to line $64c_1$ of the lines 64, which transmits to the CPU 62 a signal designated as DCH MODE. Line $66h_3$, which transmits the REQUEST ENABLE control signal from the CPU 62, is coupled to the clock (C) input terminal of a DCH REQ flip-flop 230. The data (D) input terminal of the flip-flop 230 is coupled to the true (Q) output terminal of the DCH SYNC flip-flop 214. The true (Q) output terminal of the flip-flop 230 is coupled to one of two input terminals of an AND gate 232, to the input of an inverter 234, and to one of four input terminals of the AND gate 226. The second input terminal of the AND gate 232 is coupled to a line $66h_5$ from the CPU, which transmits the data channel priority (DCHP) signal. The line $66h_5$ is also coupled to the second of the four inputs of the AND gate 226. The output terminal of the AND gate 232 is coupled to the data (D) input terminal of a DCH SEL flip-flop 236. A line $66h_6$ from the CPU 62, which line transmits the data channel address (DCA) signal, is coupled to a third input terminal of the AND gate 226 and to the clock (C) input terminal of the flip-flop 236. The DCA signal indicates that the CPU 62 is requesting an address from the interface circuit 60.

The true (Q) output terminal of the flip-flop 236 is coupled to the fourth input terminal of the AND gate 226, to the first of two input terminals of a NAND gate 238 and of an AND gate 240, and to the second input terminal of the NAND gate 218. The output terminal of the NAND gate 218 is coupled to the line 149, which transmits the clock signal to the output register 148 (FIG. 7). The output terminal of the NAND gate 238 is coupled to the line 142, which transmits the clock signal to the WORD COUNTER 140. The output terminal of the AND gate 240 is coupled to the line 155, which transmits the enable signal to the gating circuit 154. Line $66h_7$ from the CPU 62 is coupled to the second input terminals of the gates 238 and 240. This line $66h_7$ transmits the DCH INPUT signal which indicates that the CPU is requesting data be put on the data bus 114 (FIG. 7).

The set-not ($\overline{S}$) input terminals of the flip-flops 214, 230 and 236 are coupled to the source of positive potential through the resistor R10. The line $66h_4$, which transmits the $\overline{\text{RESET}}$ signal from the CPU 62, is coupled to the first of two input terminals of AND gates 242, 244 and 246. The line 152, which transmits the DCH ENABLE signal from the command register 150 (FIG. 7), is coupled to a second input terminal of the AND gate 244. The output terminal of the AND gate 244 is coupled to the reset-not ($\overline{R}$) input terminals of the flip-flops 230 and 236.

The output terminal of the AND gate 226 and the NAND gate 222 are coupled to two input terminals of a NAND gate 247. The output terminal of the NAND gate 247 is coupled to the second input terminal of the AND gate 242, and the output terminal of the AND gate 242 is coupled to the reset-not ($\overline{R}$) input terminal of the flip-flop 214.

The line 146, which transmits the COUNT ZERO signal from the WORD COUNTER 140, is coupled to the clock input terminals of a pair of flip-flops 248 and 250. The data (D) input terminal of the flip-flop 248 is coupled to ground potential. The true (Q) output terminal of the flip-flop 248 is coupled to the data (D) input terminal of the flip-flop 250 and to one of two input terminals of a NAND gate 252. The true (Q) output terminal of the flip-flop 250 is coupled to one of two input terminals of a NAND gate 254. The not true ($\overline{Q}$) output terminal of the flip-flop 250 is coupled to the second input terminal of the NAND gate 222. Line $66h_8$ from the CPU 62, which transmits a device select signal, is coupled to one of two input terminals of a NAND gate 256 and to the second input terminals of the NAND gates 252 and 254.

Line $66h_9$ from the CPU 62, which transmits the CLEAR signal, is coupled to the second input terminal of the NAND gate 256. The output terminal of the NAND gate 256 is coupled to the second input terminal of the AND gate 246. The output terminal of AND gate 246 is coupled to the reset-not ($\overline{R}$) input terminal of the flip-flop 248 and to the first of two input terminals of an AND gate 258. The line 127, which transmits the SET DCH IN BUSY control signal from the scanner revolution timing logic 102, is coupled to the second input terminal of the AND gate 258 and to the set-not ($\overline{S}$) input terminal of the flip-flop 248. The output terminal of the AND gate 258 is coupled to the reset-not ($\overline{R}$) input terminal of the flip-flop 250.

The flip-flop 248 is also known as the BUSY flip-flop, and the flip-flop 250 is known as the DONE flip-flop. These flip-flops provide control signals to the CPU 62 indicating the status of the interface circuit 60 (i.e., whether the interface circuit is BUSY or DONE with a particular operation). The signals transmitting the status to the CPU 62 are provided on line $64c_3$ at the output of the NAND gate 252 to transmit a select busy ($\overline{\text{SEL BUSY}}$) signal, or on a line $64c_4$ coupled to the output terminal of the NAND gate 254 for transmitting the select done ($\overline{\text{SELDONE}}$) signal to the CPU.

With reference to FIG. 15, a timing diagram is provided which illustrates the operation of the circuitry shown in FIGS. 7 and 14. Waveform 400 represents the TRANSFER CLOCK signal supplied on the line 98a. The period of the TRANSFER CLOCK signal is approximately 26 microseconds. Waveform 402 illustrates the sample and hold operation of the analog-to-digital (A/D) converter 58 (FIG. 6), wherein it may be seen that it takes approximately 5 microseconds before a stable output is reached. Waveform 404 illustrates the operation of the A/D 58 (FIG. 6). As may be seen, it takes a total of approximately 25 microseconds for the output of the A/D 58 to reach a stable condition, which is just prior to the positive leading edge of the next cycle of the TRANSFER CLOCK signal.

Waveform 406 illustrates the operation of the DCH SYNC flip-flop 214 (FIG. 14), and waveform 408 illustrates the corresponding state of the DCH MODE signal supplied on the line $64c_1$ (FIG. 14). Waveform 410 illustrates the DCH OUT CYCLE, which is the time window within each transfer clock cycle that new force data is transferred to the DCH output register 148 (FIG. 7). Waveform 412 illustrates the DCH IN CYCLE, which is the time window within each transfer clock cycle that position data is sent to the CPU memory for storage.

Waveform 414 represents the status of the DCH output register 198 (FIG. 7), which changes state after completion of the DCH OUT CYCLE (waveform 410) as indicated at point 414a of the waveform 414. Waveform 416 represents the status of the position register 110 (FIG. 7), and waveform 418 represents the status of the force register 108 (FIG. 7). Note that these registers change state at the same time, which corresponds to the positive going edge of the TRANSFER CLOCK signal. Waveform 420 represents the multiplexer select signal (OUT/IN) supplied on the line 144 (FIG. 7). Finally, waveform 422 represents the output of the digital-to-analog (D/A) converter 68 (FIG. 6).

From the foregoing detailed description of the present invention, it should be apparent that a recording and reproducing apparatus has been shown and described which offers many significant advantages over prior apparatus. Among the desirable attributes of the apparatus described herein are the capabilities of recording a plurality of sets of tracks simultaneously on very narrow tracks with the apparatus having the capability of accurately following the tracks during reproducing even though the tape relative head to transport speed may vary significantly. Also during the recording mode of operation, sets of tracks can be recorded along a desired angle relative to the longitudinal direction of the tape even though the relaive head to tape transport speed may vary. The use of a CPU for receiving position information of the movable head mounting assemblies which carry the transducing heads and for generating forcing signals for moving the movable head mounting assemblies to follow a desired track, i.e., the previously recorded track during reproducing or a desired path during recording, can be accomplished even though the tape transport speed may be other than normal. The use of the CPU to perform the calculations and generate the forcing signals for controlling the precise positioning of the mounting head movable assemblies carrying the transducing heads permits the apparatus to be operated at a much faster rotational speed relative to prior art apparatus and to accurately follow extremely narrow tracks, which has not heretofore been possible with conventional error correcting mechanisms of this type.

It is of course understood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims. What is claimed is:

1. In a system for transferring information signals with respect to a recording medium that is movable at various transport speeds:

transducing means for transferring information with respect to tracks oriented at an acute angle relative to the longitudinal direction of said recording medium;

means responsive to the recording medium transport speed for generating transport speed indication signals;

means for mounting said transducing means so that said transducing means is movable substantially transverse in either direction relative to the longitudinal direction of the tracks, said mounting means being carried by a rotatable element that is rotated so as to provide substantially all of the relative movement between said transducing means and said recording medium to transfer information with respect to said tracks as the transducing means scans said medium;

means for moving said mounting means transversely relative to the longitudinal direction of the tracks in response to drive signals being applied to said mounting means;

means coupled to said mounting means for sensing the information signals recorded on the recording medium and generating position signals indicative of the instantaneous position of said transducing means relative to the track scanned by the transducing means;

means for generating drive signals for moving the mounting means so that said transducing means is moved along a predetermined path trajectory to record each track along a specific path angle, said drive signal generating means being responsive to the position signals and said speed indication signals and providing varying drive signals to accommodate varying recording medium transport speeds to thereby maintain said specific path angle during recording.

2. In a system as defined in claim 1, said drive signal generating means produces drive signals moving said transducing means in one transverse direction for said transducing means to follow said path trajectory during recording and in the opposite direction to return to a position which again permits following said path trajectory, said trajectory beginning before said transducing means is in transducing relation with said recording medium.

3. In a system as defined in claim 2, said drive signal generating means produces signals for moving said transducing means in said opposite direction during one or more successive revolutions of said rotatable element when recording is not occurring during each successive revolution thereof.

4. In a system as defined in claim 1, said drive signal generating means including digital computing means, said computing means responsive to said position signals and speed indicating signals to generate digital drive signals.

5. In a system as defined in claim 4, said means for moving said mounting means is responsive to analog drive signals, said drive signal generating means further including digital to analog conversion means for converting the digital drive signals generated by the digital computing means to the analog drive signals for application to said means for moving said mounting means.

6. In a method for recording data being transmitted at varying rates, said method being adapted for use in a recording and reproducing apparatus of the type which has transducing means operably supported by rotation means for scanning a medium along a plurality of adjacent tracks oriented at an angle relative to the lengthwise direction of the medium, the rotation means including movable means carrying said transducing means and effecting movement of said transducing means in opposite directions relative to a home position along a path generally transverse to the direction of said tracks and including means for transversely moving said transducing means relative to said home position to record said tracks substantially parallel to one another, comprising the steps of:

maintaining the angular velocity of said rotation means generally constant;

adjusting the transport speed of the medium scanned by the transducing means to a desired speed within the range between a forward direction limit and a reverse direction limit, said range including zero speed;

monitoring the position of the transducing means relative to said home position;

comparing the position of the transducing means with a position corresponding to a desired tracking path determined by a particular speed and direction of transport of said tape; and, transversely moving said transducing means as a function of said monitoring and comparing steps to a position corresponding with said desired tracking path so as to record the tracks parallel to one another.

7. A method as defined in claim 6 further characterized by said step of monitoring including generating transverse position data representative of the instantaneous position of said transducing means.

8. A method as defined in claim 6 further characterized by producing electrical pulses representative of discrete angular divisions of rotation of said rotation means.

9. A method as defined in claim 8 further characterized by deriving digital address numbers for each of said discrete divisions of angular rotation, each of said address numbers corresponds to the instantaneous angular position of said transducing means for each corresponding discrete angular division of rotation of said rotation means.

10. A method as defined in claim 9 further characterized by converting said transverse position data into a block of digital position numbers, each of said position numbers corresponding to the instantaneous transverse position of said transducing means relative to said home position.

11. A method as defined in claim 10 further characterized by storing said transverse position numbers at unique address locations of a storage means, said address locations corresponding to said address numbers.

12. A method as defined in claim 11 further characterized by computing a block of digital numbers representative of electric signals for transversely moving the transducing means, said block of digital numbers being computed on the basis of the step of monitoring the position of the transducing means and said transverse position numbers stored in said storage means.

13. A method as defined in claim 6 further characterized by said medium being at normal speed of transport during recording data, adjusting desired transport speed of the medium to less than the normal speed whereby said transport means is caused to scan each track a selected number of times, and recording data on each track during one of said number of scans of said each track.

14. A method as defined in claim 13 further characterized by adjusting the desired transport speed of the medium during reproduction of data that is recorded on said medium to a speed other than the transport speed during the recording of said data.

15. In a system for transferring information with respect to a recording medium that is movable at various transport speeds:

transducing means for transferring information simultaneously with respect to a plurality of generally parallel tracks forming a set, each track of each set oriented at the same acute angle relative to the longitudinal direction of said recording medium;

means responsive to the recording medium transport speed for generating transport speed indication signals;

means for mounting said transducing means so that said transducing means is movable substantially transverse in either direction relative to the longitudinal direction of the tracks, said mounting means being carried by a rotatable element that is rotated so as to provide substantially all of the relative movement between said transducing means and said recording medium to reproduce information from said tracks as the transducing means scans said medium;

means for moving said mounting means transversely in either direction relative to the longitudinal direction of the tracks in response to drive signals being applied to said mounting means;

means coupled to said mounting means for sensing the transverse position and generating position signals indicative of the instantaneous position of said transducing means relative to the home position thereof;

means for generating drive signals for moving the mounting means so that said transducing means is moved along a predetermined path trajectory to reproduce information signals simultaneously from tracks of a set, said drive signal generating means being responsive to the position signals and said speed indication signals and providing varying drive signals to accommodate varying recording medium transport speeds to thereby cause said transducing means to follow said tracks during reproducing.

16. In the system as defined in claim 15, means for generating error signals indicating deviation of said transducing means from said tracks;

said drive signal generating means being responsive to said error signals for generating drive signals for moving said mounting means so that the transducing means follows said tracks during reproducing.

17. In a system as defined in claim 16, said drive signal generating means includes computing means, said computing means responsive to said error signals to compute modifications to said path trajectory to cause said transducing means to more closely follow said tracks during reproducing.

18. In a system as defined in claim 16 wherein said drive signal generating means includes digital computing means, said digital computing means responsive to said error signals, position signals and speed indicating signals to generate the drive signals.

19. In a system for transferring information signals with respect to a recording medium that is transportable at a selected speed and direction, comprising:

transducing means for transferring information signals simultaneously with respect to a plurality of generally parallel tracks on said recording medium, each plurality of tracks defining a set of tracks;

means for mounting said transducing means so that said transducing means is capable of moving substantially transverse relative to the longitudinal direction of the sets of tracks, said mounting means being carried by a rotatable element that is rotated so as to provide substantially all of the relative movement between said transducing means and said medium to record information on said medium;

means for selectively moving said mounting means so that said transducing means is moved transversely in either direction relative to a home position in response to selective electric signals being applied tosignals and applying the same to said moving means, said signal generating means responsive to said information signals recorded on the recording medium to generate said electric signals for positioning said transducing means to record simultaneously the tracks of a set along a preselected path, and to subsequently so record additional sets of tracks along paths parallel to said preselected path at any selected speed and direction of the transport of said recording medium.

20. A system as defined in claim 19 further characterized by means for sensing the position of said transducing means coupled to said means for producing said electric signals and being disposed for providing transverse position data representative of the instantaneous position of said transducing means relative to said home position.

21. A system as defined in claim 20 further characterized by said means for sensing comprising an electromagnetic coil assembly having a movable core thereof operatively coupled to said transducing means.

22. A system as defined in claim 20 further characterized by each set of tracks including at least one control track of selected control information, and said means for sensing comprising a read magnetic head disposed in said transducing means for reading said control track.

23. A system as defined in claim 20 further characterized by said means for sensing comprising an electromagnetic coil assembly having a stationary core thereof, said electromagnetic coil being operatively coupled to said transducing means.

24. A system as defined in any one of claims 14 to 23 further characterized by means for generating said electric signals and applying the same to said mounting means to cause said transducing means to follow said sets of tracks during reproducing thereof, said electric signals corresponding to the transducing means position relative to said home position, said electric signal generating means coupled to monitor the position of said transducing means relative to said home position and is responsive to the monitored position to generate said electric signals for selective transverse movement of said transducing means at the completion of reproducing one of said sets of tracks, so that said transducing means is positioned to begin reproducing the proper set of tracks determined as a function of the speed and direction of movement of the medium.

25. A system as defined in claim 24 wherein said transverse movement of said mounting means is gradual to have the transducing means follow the sets of tracks during reproducing and is abrupt at the completion of reproducing a set of tracks in the event said transducing means has been moved to its maximum transverse movement limit.

26. A system defined in claim 24 wherein said transducing means at the completion of the reproduction of one set of tracks is positioned for beginning reproduction of the next successive adjacent set of tracks in the absence of transverse movement of said transducing means, transverse movement approximately equal to the center-to-center spacing between adjacent sets of tracks of said transducing means in a first direction being effective to repeat the reproduction of the set of tracks whose reproduction was last completed, an equal amount of movement in the opposite direction being effective to skip one set of tracks.

27. A system as defined in claim 24 further characterized by said transducing means including a plurality of magnetic record/reproduce heads disposed for recording and reproducing a corresponding plurality of information channels on said medium, at least one control track record magnetic head, and at least one control track reproduce magnetic head, said control track record/reproduce heads being disposed for monitoring the position of said transducing means relative to said home position and said control track reproduce head providing monitor position signals coupled to said means for generating said electric signals.

28. A system as defined in claim 22 further characterized by said means for sensing comprising an electromagnetic coil assembly having a movable core thereof operatively coupled to said transducing means.

29. A system as defined in claim 20 further characterized by tachometer means providing a series of electrical pulses representing the division of each rotation of said rotatable element into a discrete number of segments of angular position; and, said means for generating including means for deriving a digital address number for each of said discrete segments of angular position, wherein the value of each of said address numbers corresponds to the instantaneous angular position of said transducing means during each such discrete segment.

30. A system as defined in claim 29 further characterized by means for converting said transverse position data into a block of digital position numbers, each of said position numbers being representative of the instantaneous transverse position of said transducing means relative to said home position.

31. A system as defined in claim 30 further characterized by said converting means is operative in response to said tachometer means electrical pulses such that each of said position numbers corresponds to a segment of rotation of said rotatable element.

32. A system as defined in claim 31 further characterized by means for storing said position numbers at unique address locations of said means for storing wherein said address locations correspond to said digital address binary numbers, said generating means responsive to recorded information signals and stored position numbers.

33. A system as defined in claim 32 further characterized by means for computing a block of digital numbers representative of electric signals for positioning the transducing means relative to said preselected path, said computing means responsive to said transverse position numbers stored in said storing means.

34. A system as defined in claim 19 further characterized by said means for generating said electric signals including means for storing data representative of said electric signals required for selectively moving said transducing means along said selected path, said generating means responsive to recorded information signals and stored data to generate said electric signals.

35. A system as defined in claim 19 further characterized by said recording medium having a normal speed and direction of transport, said means for generating electric signals responsive to the recording medium being transported at a speed other than the normal speed to generate electric signals for positioning said transducing means to scan each set of tracks a plurality of time, and said transducing means responsive to the recording medium being transported at a speed other than the normal speed to transfer information signals relative to each set of tracks during a selected one of the plurality of times, said each set is scanned by said transducing means.

36. In an apparatus having transducing means operably supported by rotation means for scanning a magnetic tape simultaneously along a plurality of adjacent tracks forming a set of tracks to transfer information signals with respect to said tape as it is transported at a selected speed and direction, the rotation means including movable means carrying said transducing means and in response to drive signals effecting movement of said transducing means in opposite directions relative to a home position and generally transverse to the direction of said sets of tracks;
 means coupled to said transducing means for sensing the transverse position thereof, and being disposed for providing position data representative of the instantaneous transverse position of said transducing means relative to said home position;
 means for storing said position data for more than one scan of the tape by the transducing means;
 means for generating said electric signals and applying the same to said movable means, said signal generating means responsive to position data provided by the sensing means and stored position data provided by the storing means during the scan of the tape by the transducing means for positioning said transducing means to record simultaneously tracks of a set along a desired path, and to record additional sets of tracks along paths parallel to said selected path at any speed and direction of transport of said tape.

37. An apparatus as in claim 36 further characterized by said means for sensing comprising an electromagnetic coil assembly having a movable core operatively coupled to said movable means.

38. An apparatus as in claim 36 further characterized by said means for sensing comprising an electromagnetic coil assembly having a fixed core, said electromagnetic coil being operatively coupled to said movable means.

39. An apparatus as in claim 36 further characterized by each set of tracks including at least one control track of selected control information, and said sensing means comprising a read head disposed in said transducing means for reading said control track.

40. Apparatus as defined in claim 39 further characterized by said means for sensing comprising an electromagnetic coil assembly having a movable core operatively coupled to said movable means.

41. An apparatus as defined in claim 36 further characterized by tachometer means for producing a series of electrical pulses representing the division of each rotation of said rotation means into a discrete number of segments of angular position; and,
 said generating means including means for deriving a digital address number for each of said discrete segments of angular position, wherein the value of each of said address numbers corresponds to the instantaneous angular position of said transducing means during each such discrete segment of rotation.

42. Apparatus as defined in claim 41 further characterized by said means for storing responsive to the address numbers to store transverse position data of the transducer means sensed at each segment of rotation of the rotation means at locations identified by the address numbers corresponding to said each segment.

43. An apparatus as in claim 36 further characterized by means for computing a block of binary numbers representative of said electric signals for positioning said transducing means along said selected path, said means for computing operative in response to said transverse position data.

44. Apparatus as defined in claim 36 further characterized by said recording medium having a normal speed and direction of transport, said means for generating electric signals responsive to the recording medium being transported at a speed other than the normal speed to generate electric signals for positioning said transducing means to scan each set of tracks a plurality of time, and said transducing means responsive to the recording medium being transported at a speed other than the normal speed to transfer information signals relative to each set of tracks during a selected one of the plurality of times, said each set is scanned by said transducing means.

* * * * *

UNITED STATES PATENT AND TRADEMARK OFFICE
CERTIFICATE OF CORRECTION

PATENT NO. : 4,485,414

DATED : November 27, 1984

INVENTOR(S) : Billy R. Baker

It is certified that error appears in the above-identified patent and that said Letters Patent is hereby corrected as shown below:

Column 4, line 6, delete "another interface";
Column 9, line 41, change "reproducing" to --reproduced--;
Column 15, line 38, delete "the" in the first occurrence;
Column 18, lines 28-29, change "(ONCE AROUND)" to --(ONCE AROUND)--;
Column 18, lines 35-36, change "REV. ZERO" to --REV. ZERO--;
Column 22, line 16, change "26" to --20--;
Column 22, line 19, after "Only" insert --the--;
Column 23, line 32, after "no" insert --new--;
Column 23, line 55, change "when" to --which--;
Column 25, line 33, change "ONCE AROUND" to --ONCE AROUND--;
Column 26, lines 1-2, change "REV. ZERO" to --REV. ZERO--;
Column 26, line 4, change "cause" to --causes--;
Column 26, line 13, change "ONCE AROUND" to --ONCE AROUND--;
Column 26, line 28, change "ONCE AROUND" to --ONCE AROUND--;
Column 26, line 30, change "ONCE AROUND" to --ONCE AROUND--;

UNITED STATES PATENT AND TRADEMARK OFFICE
CERTIFICATE OF CORRECTION

PATENT NO. : 4,485,414

DATED : November 27, 1984

INVENTOR(S) : Billy R. Baker

Page 2 of 2

It is certified that error appears in the above-identified patent and that said Letters Patent is hereby corrected as shown below:

Column 29, line 30, delete "tape"; after "to" insert --tape--;

Column 29, line 45, change "mounting head movable" to --movable head mounting --.

Signed and Sealed this

Third Day of December 1985

[SEAL]

Attest:

DONALD J. QUIGG

Attesting Officer

Commissioner of Patents and Trademarks